(12) United States Patent
Obikane

(10) Patent No.: US 9,880,374 B2
(45) Date of Patent: Jan. 30, 2018

(54) ZOOM LENS AND IMAGING APPARATUS

(71) Applicant: TAMRON CO., LTD., Saitama-shi, Saitama (JP)

(72) Inventor: Yasuhiko Obikane, Saitama (JP)

(73) Assignee: TAMRON CO., LTD., Saitama-shi (JP)

( * ) Notice: Subject to any disclaimer, the term of this patent is extended or adjusted under 35 U.S.C. 154(b) by 0 days.

(21) Appl. No.: 15/235,699

(22) Filed: Aug. 12, 2016

(65) Prior Publication Data
US 2017/0052344 A1     Feb. 23, 2017

(30) Foreign Application Priority Data

Aug. 21, 2015   (JP) .................. 2015-163920

(51) Int. Cl.
| | |
|---|---|
| *G02B 15/16* | (2006.01) |
| *G02B 15/20* | (2006.01) |
| *G02B 27/00* | (2006.01) |
| *G02B 27/64* | (2006.01) |
| *G02B 13/00* | (2006.01) |

(52) U.S. Cl.
CPC ........... *G02B 13/009* (2013.01); *G02B 15/16* (2013.01); *G02B 15/20* (2013.01); *G02B 27/0025* (2013.01); *G02B 27/646* (2013.01)

(58) Field of Classification Search
CPC ...... G02B 13/009; G02B 15/16; G02B 15/20; G02B 27/646; G02B 27/0025
USPC ........................................................ 359/557
See application file for complete search history.

(56) References Cited

U.S. PATENT DOCUMENTS

| | | | |
|---|---|---|---|
| 5,946,145 A | 8/1999 | Ohtake | |
| 2002/0101661 A1* | 8/2002 | Harada | ................ G02B 15/173 359/557 |
| 2012/0062994 A1 | 3/2012 | Uchida et al. | |
| 2013/0176479 A1 | 7/2013 | Wada | |

FOREIGN PATENT DOCUMENTS

| | | |
|---|---|---|
| JP | H10-62688 A | 3/1998 |
| JP | 2012-83702 A | 4/2012 |
| JP | 2013-142781 A | 7/2013 |
| JP | 5518530 B2 | 6/2014 |

* cited by examiner

*Primary Examiner* — Thomas K Pham
*Assistant Examiner* — Mitchell Oestreich
(74) *Attorney, Agent, or Firm* — Westerman, Hattori, Daniels & Adrian, LLP

(57) ABSTRACT

The present invention provides a zoom lens that is compact in general and has an F-number to implement brightness even in the telephoto end side, and an imaging apparatus equipped with the zoom lens. The zoom lens includes, in order from an object side: a first lens group having positive refractive power; a second lens group having positive refractive power; a third lens group having negative refractive power; and a fourth lens group having positive refractive power. At the time of zooming from the wide-angle end state to the telephoto end state, the third lens group moves so that the distance between the second lens group and the third lens group increases, and the distance between the third lens group and the fourth lens group decreases.

7 Claims, 28 Drawing Sheets

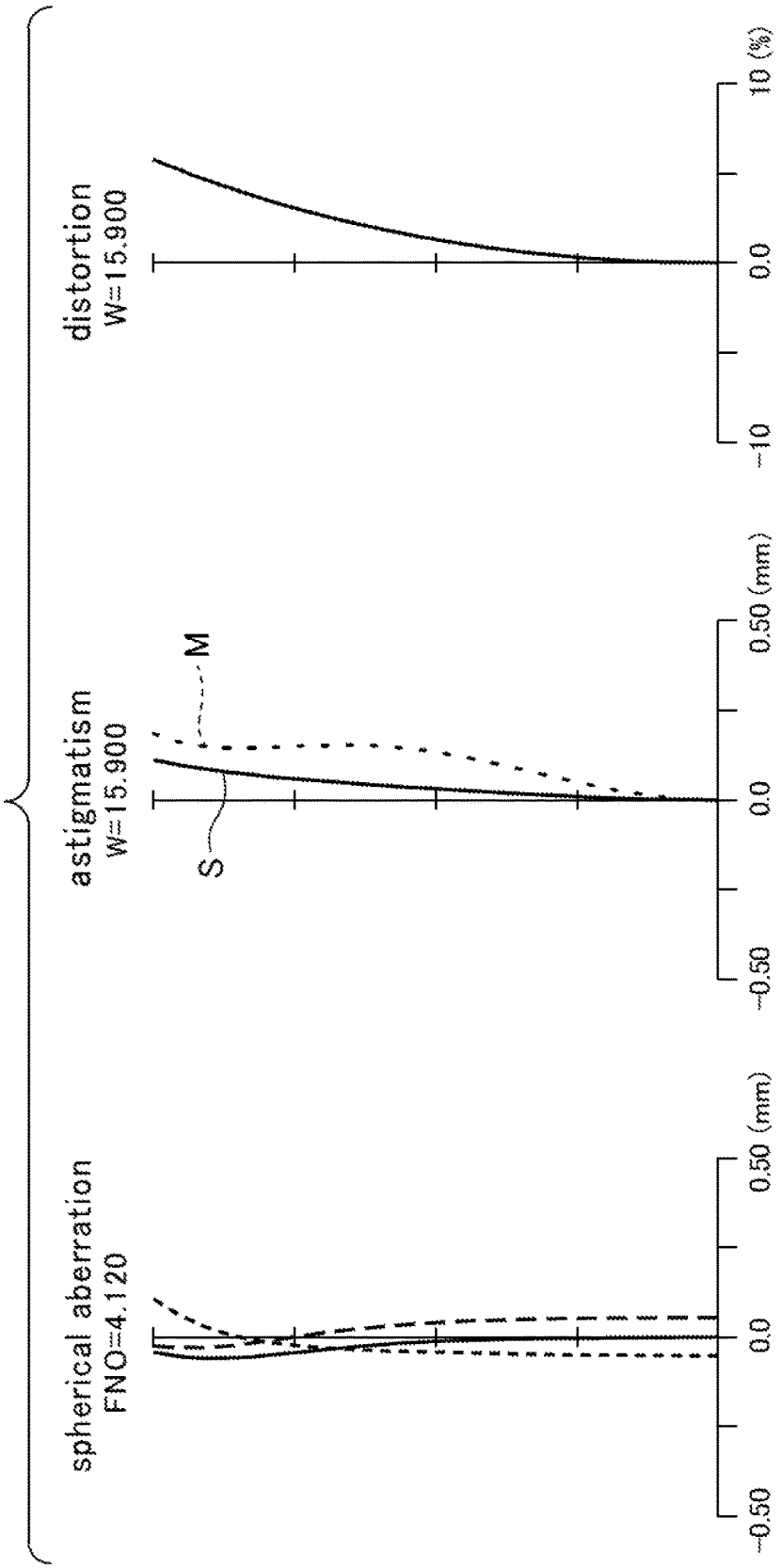

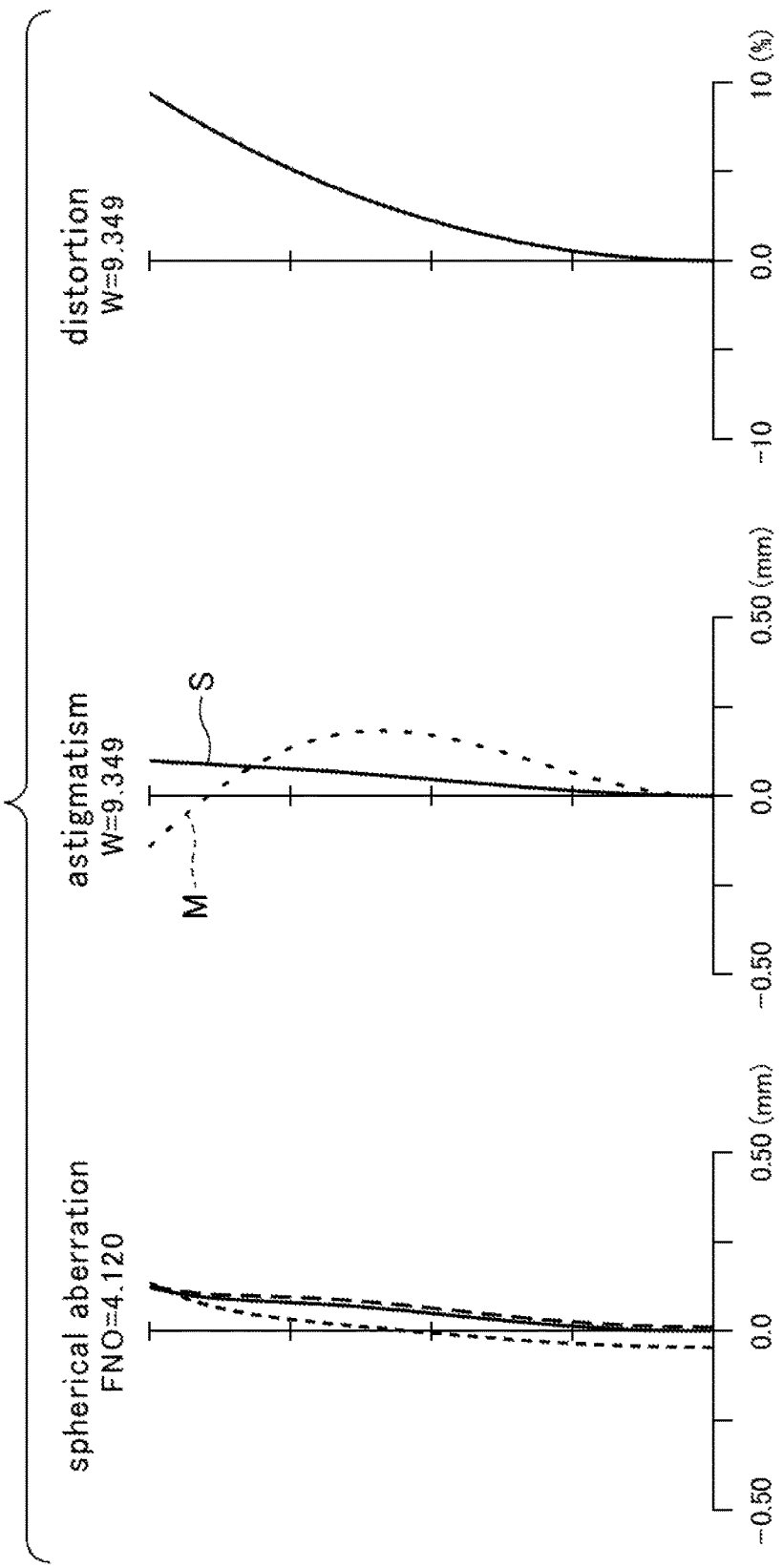

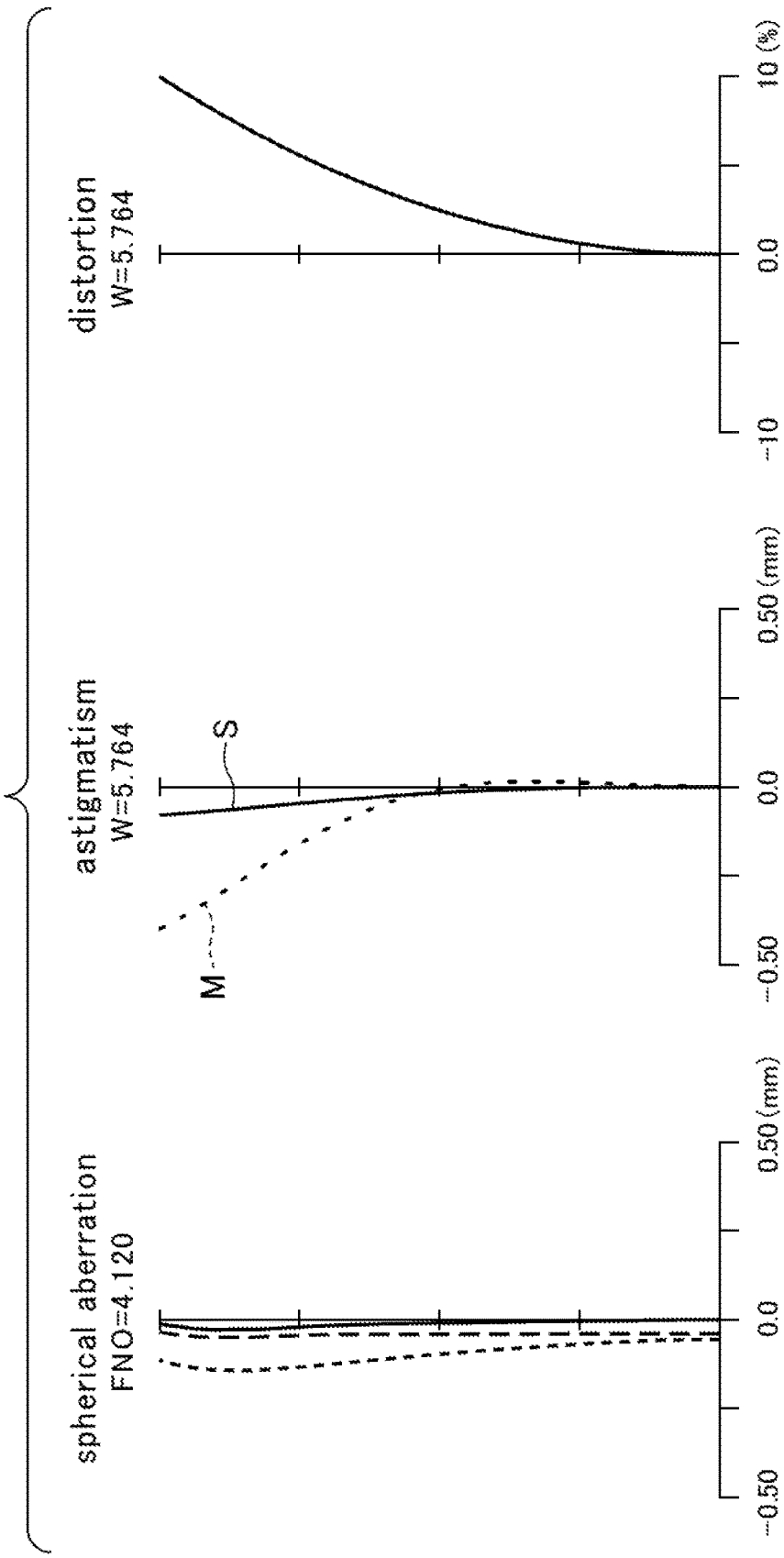

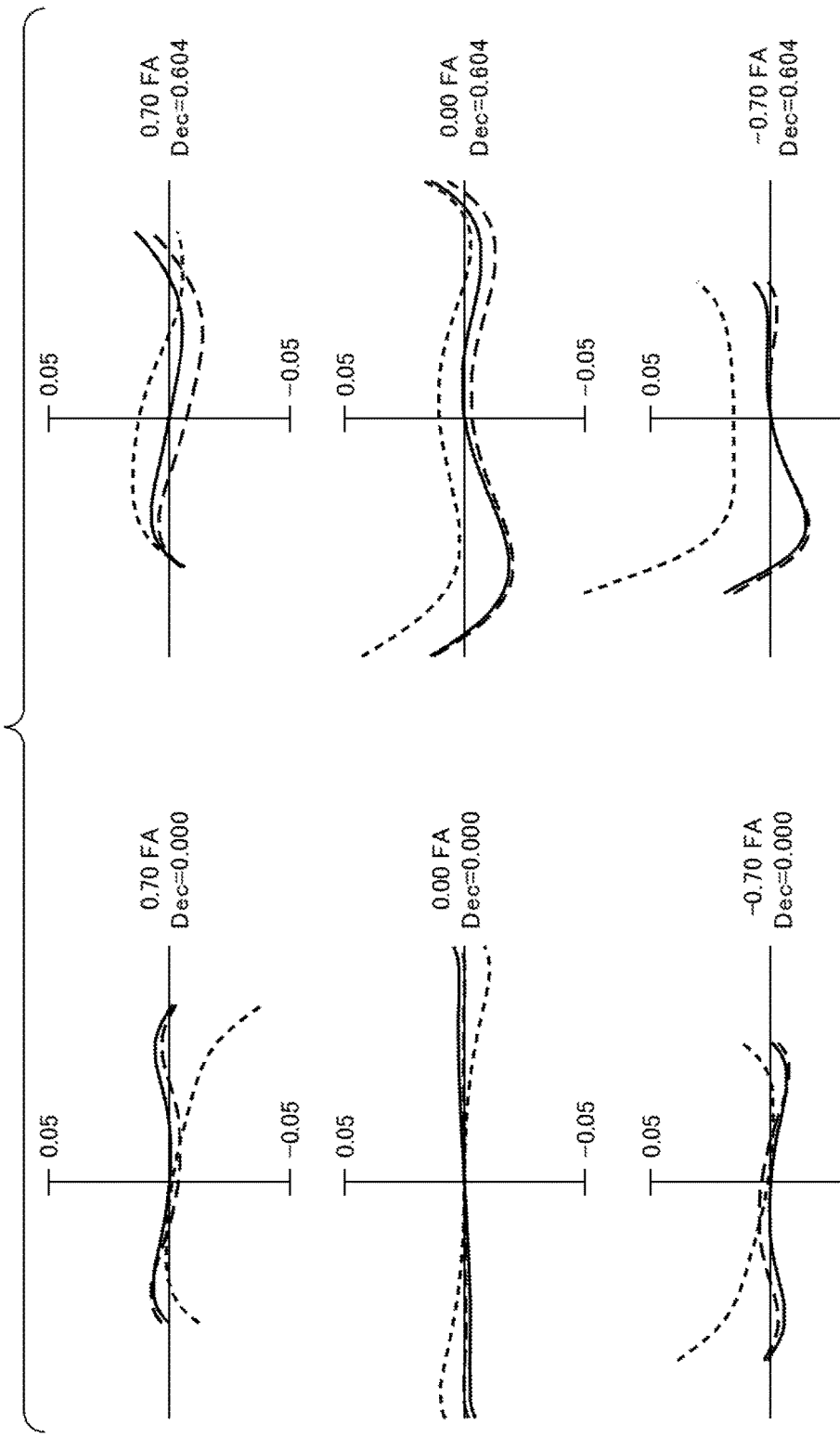

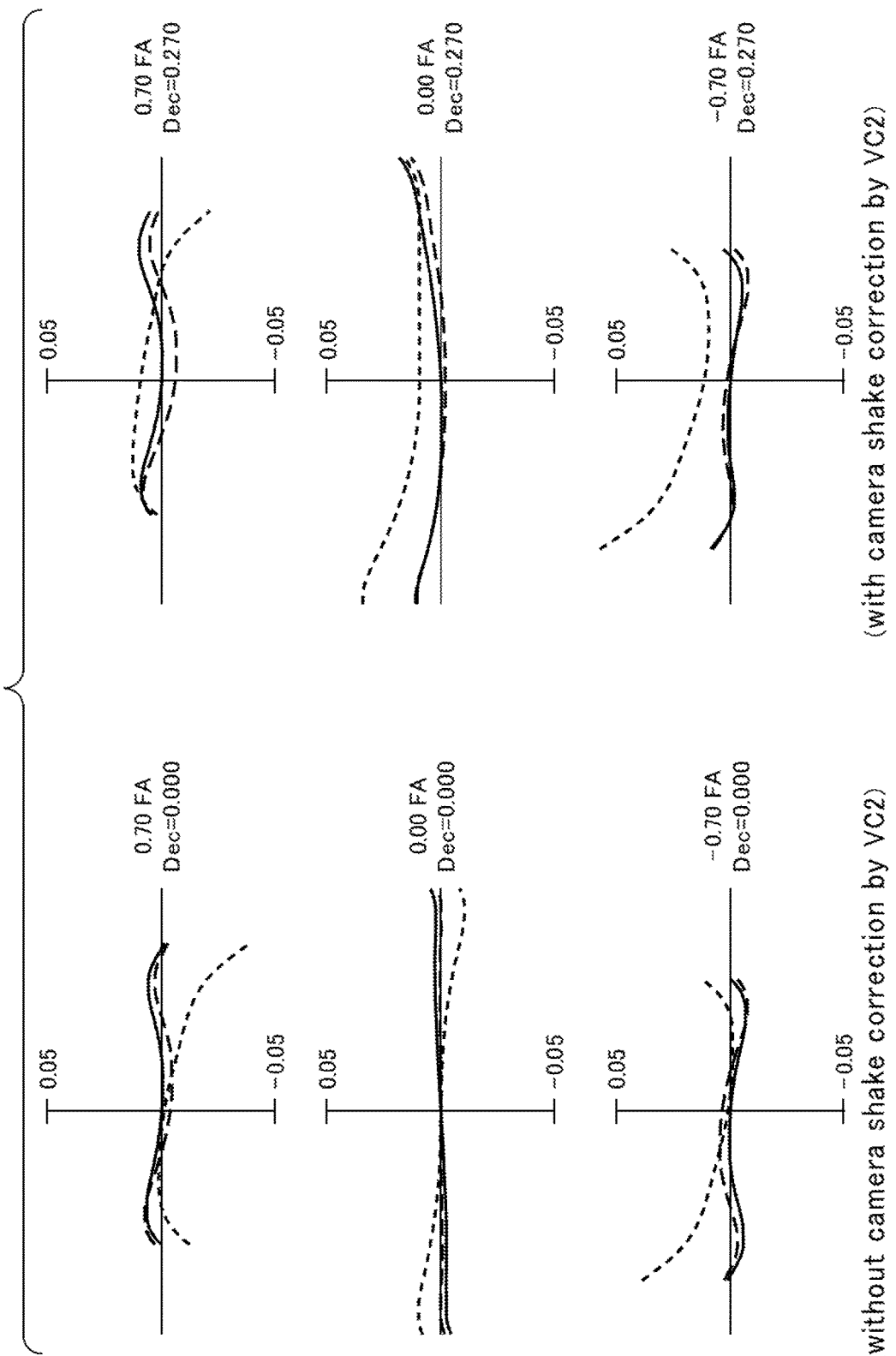

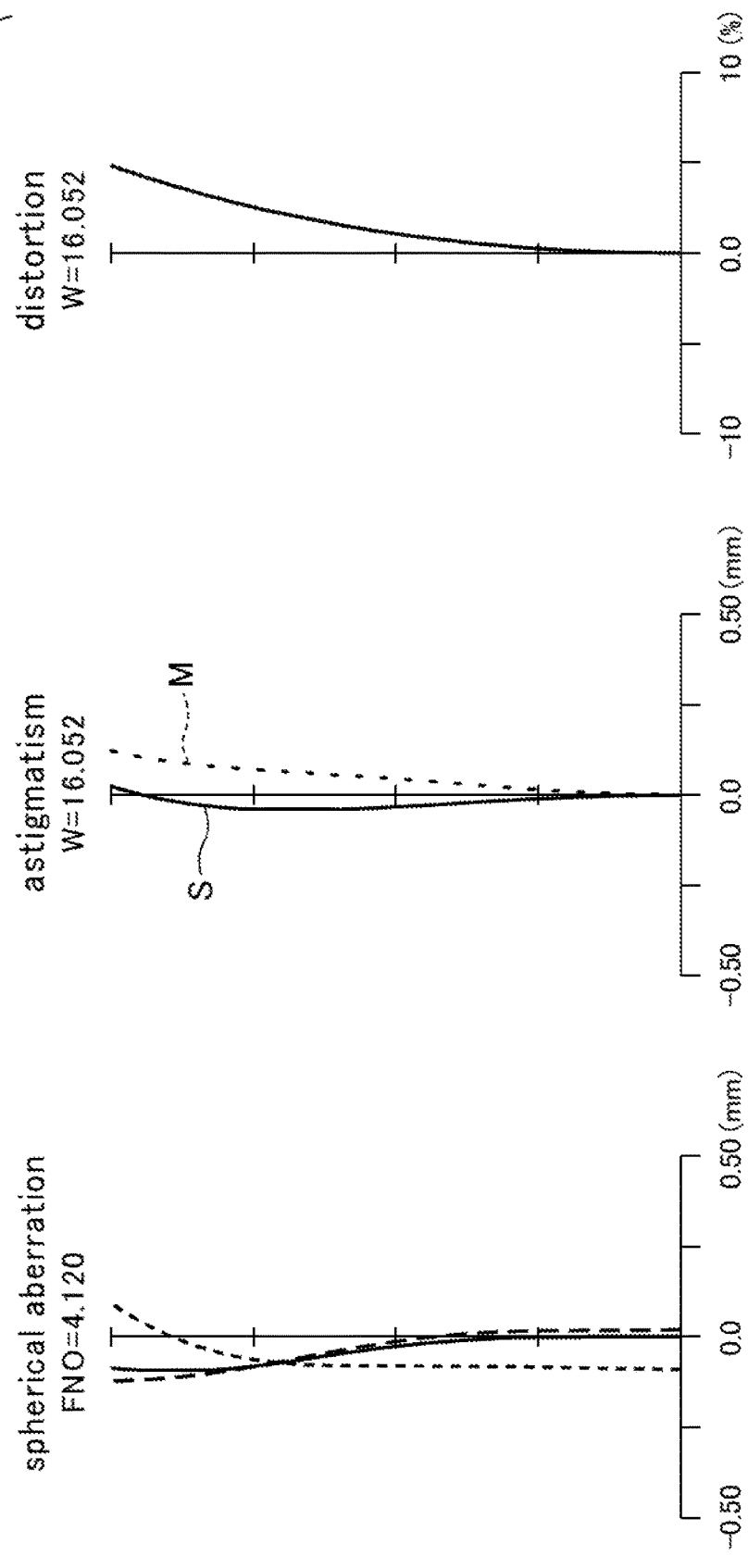

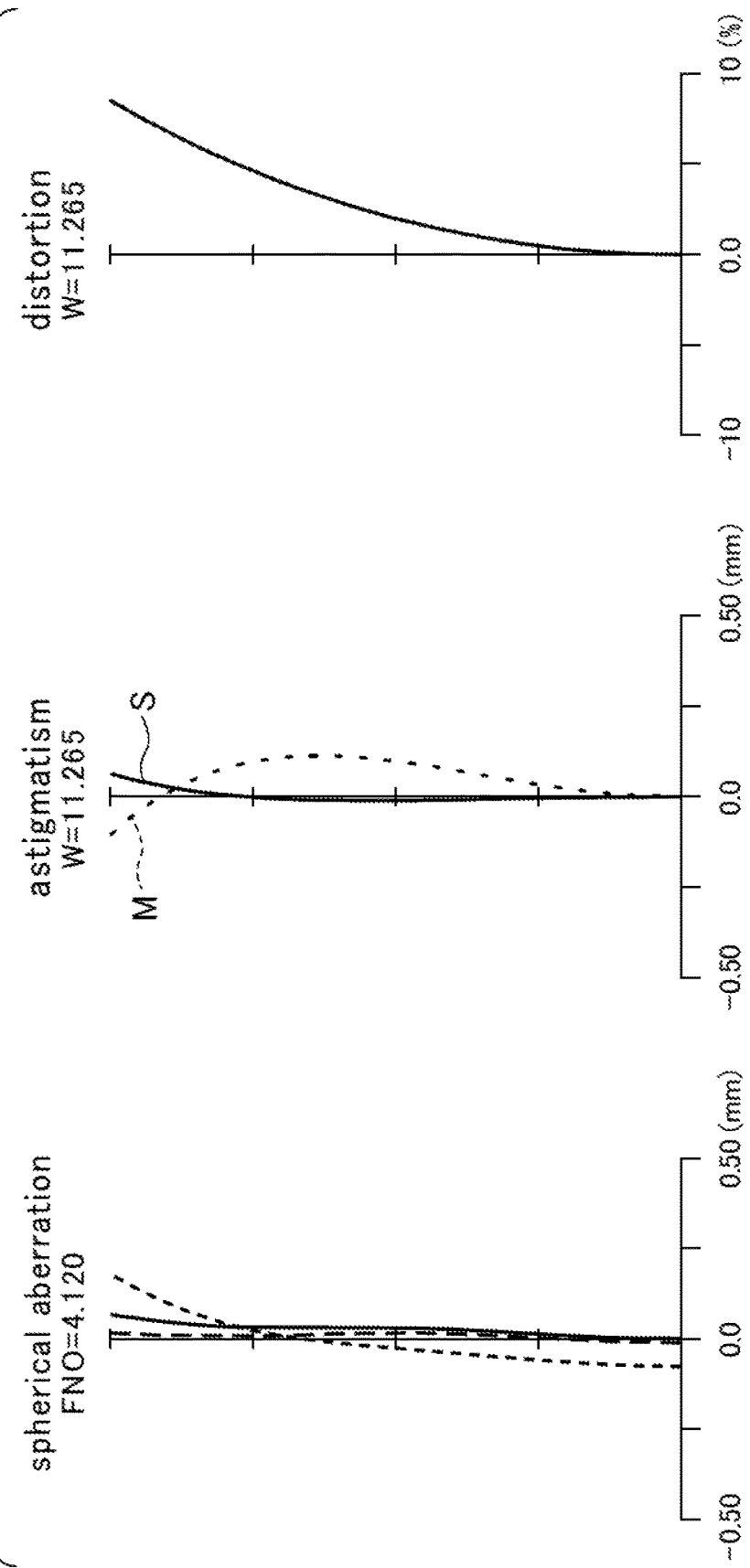

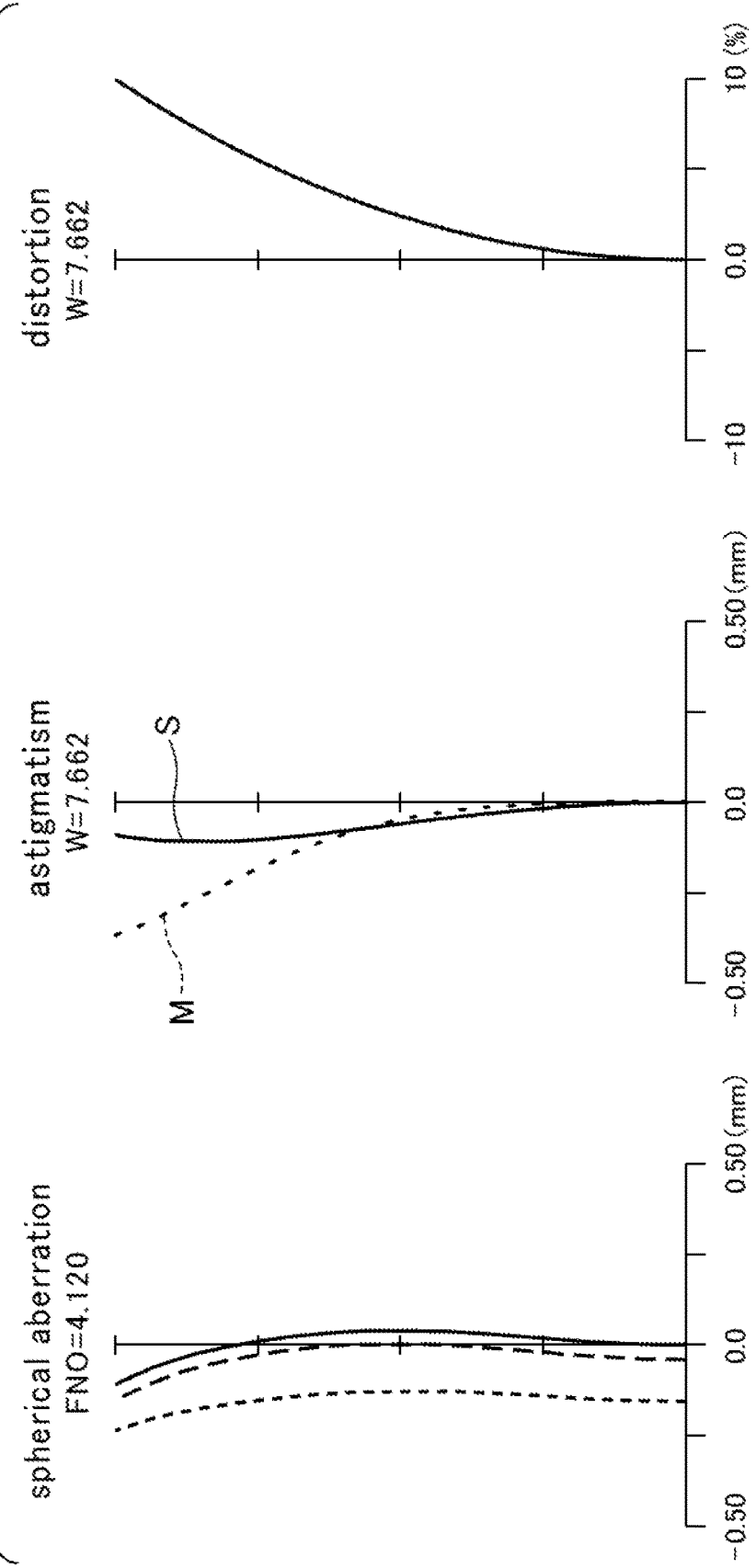

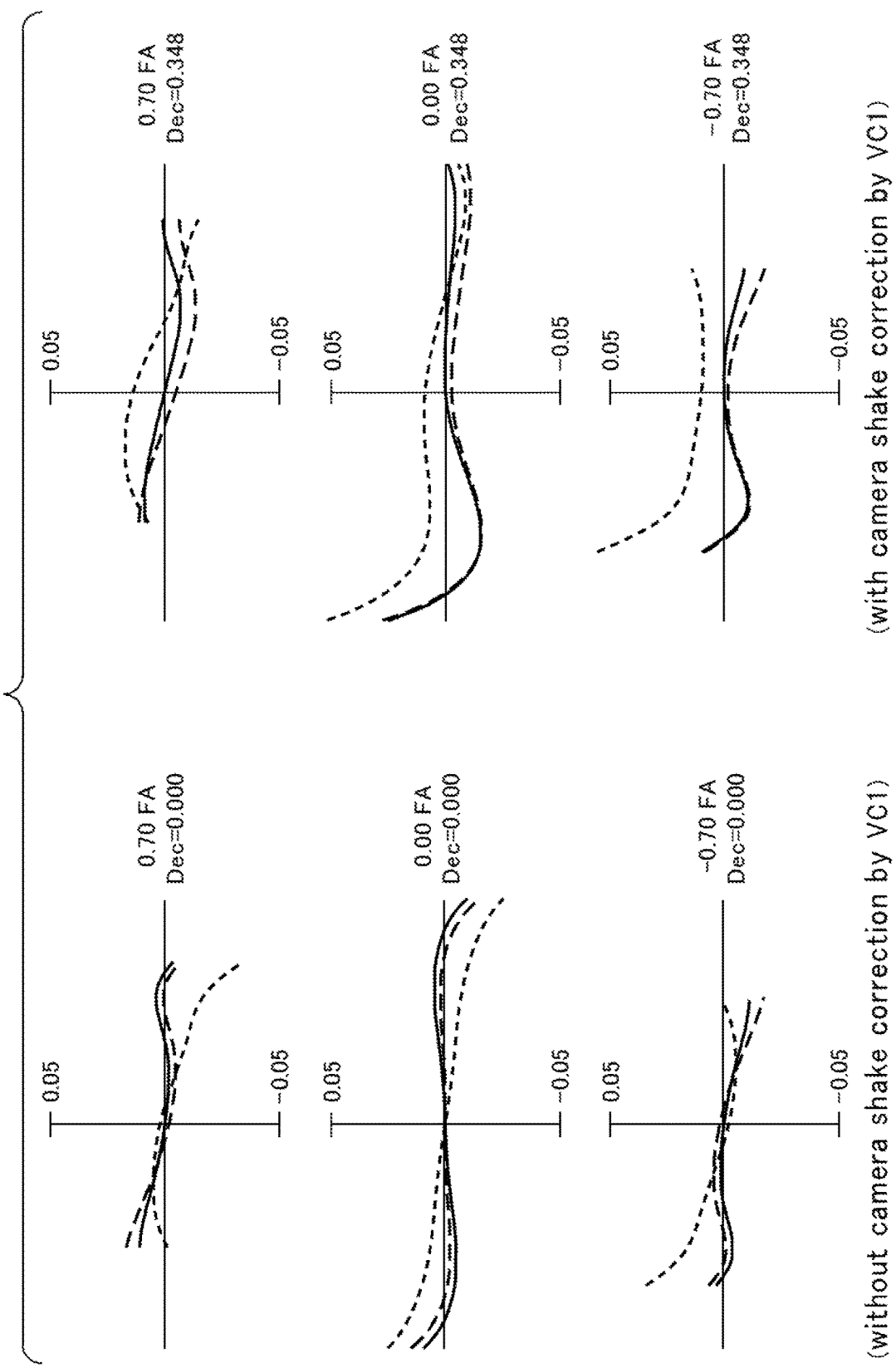

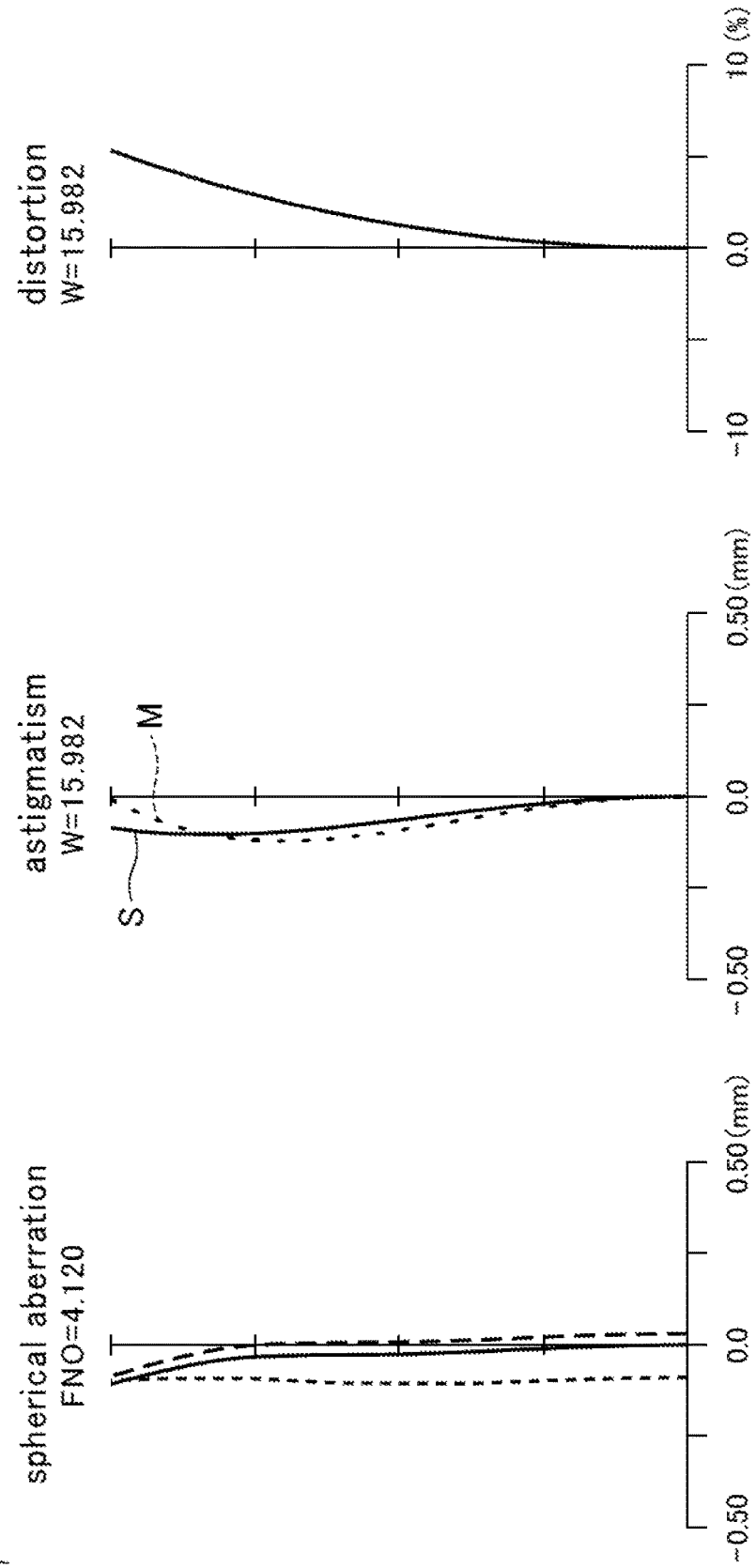

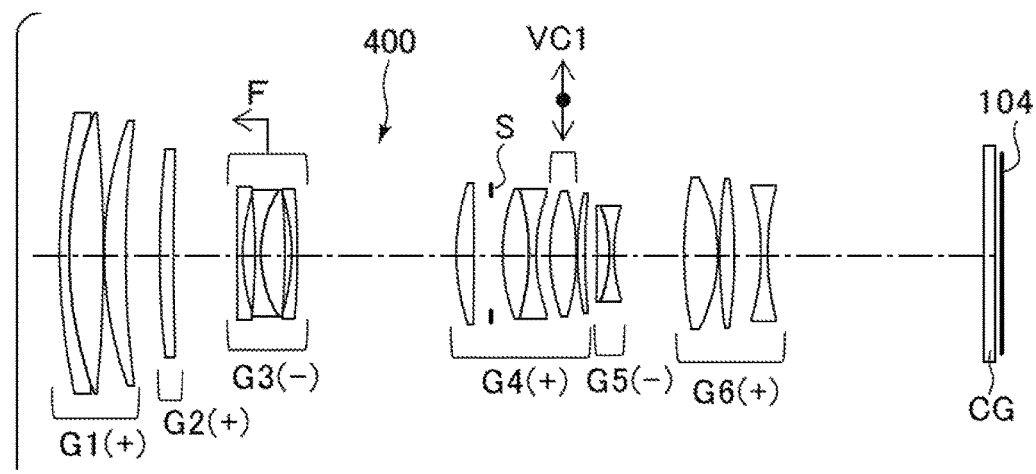
FIG.18a
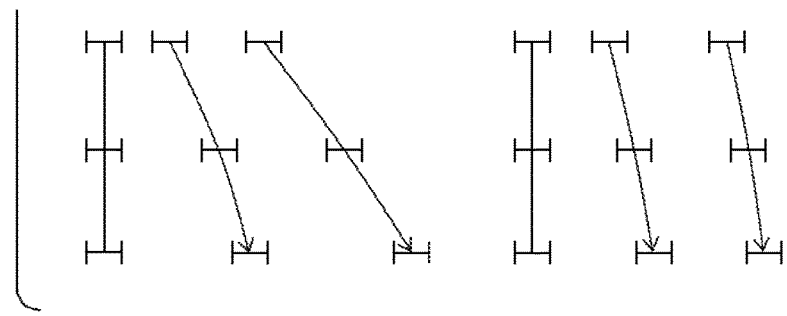
FIG.18b
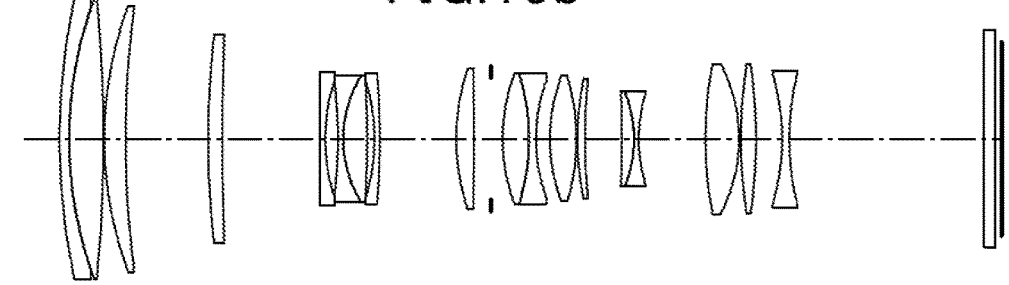
FIG.18c
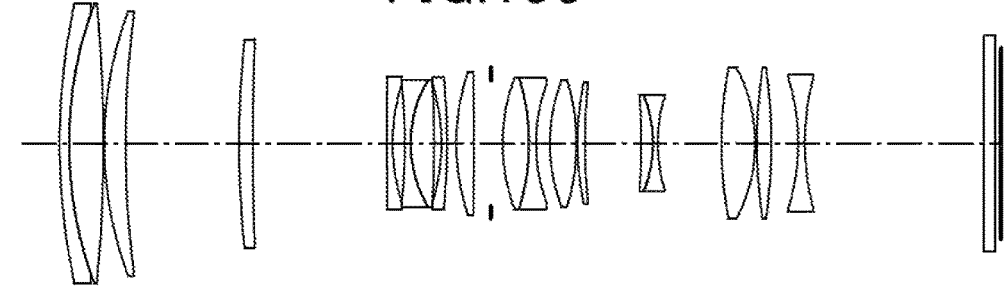

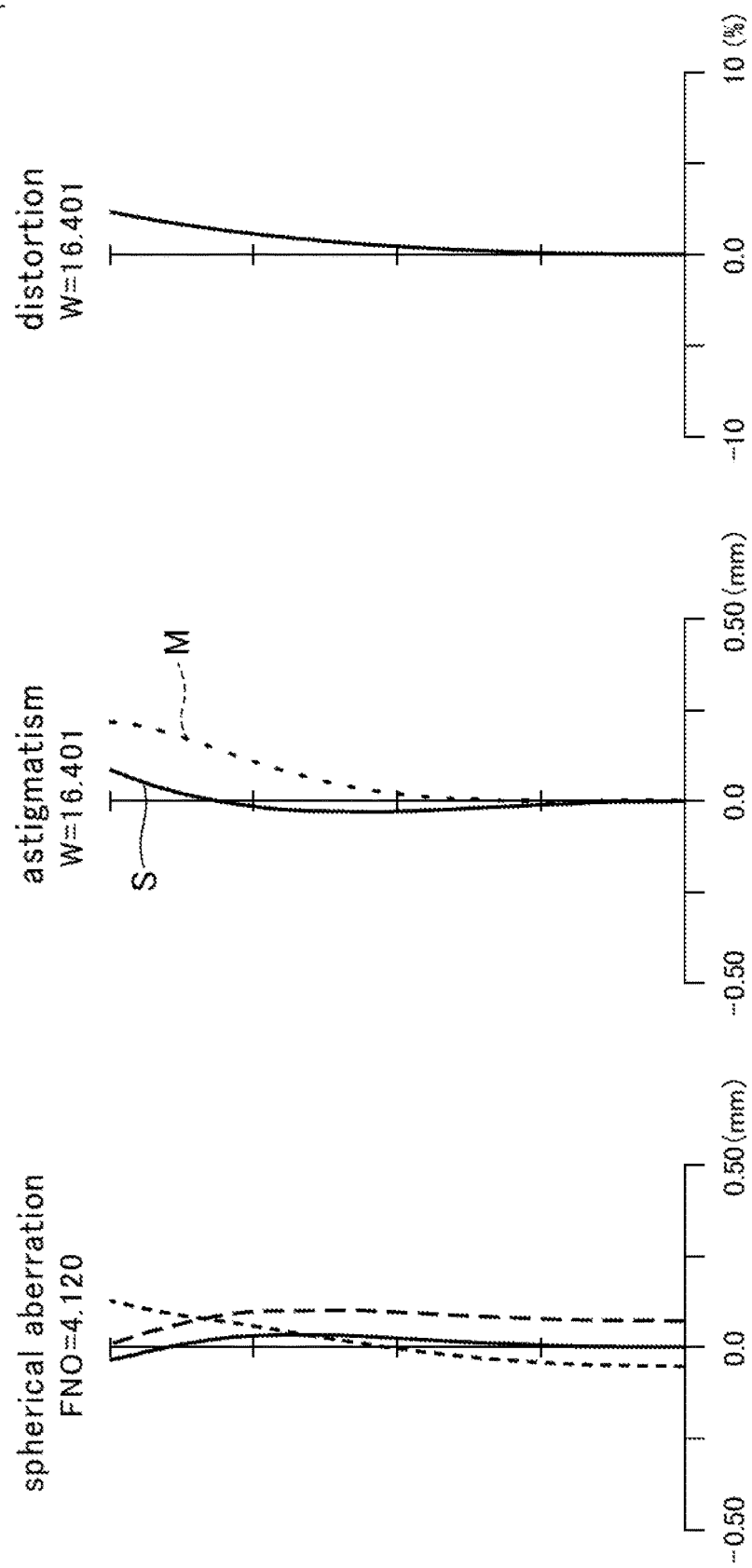

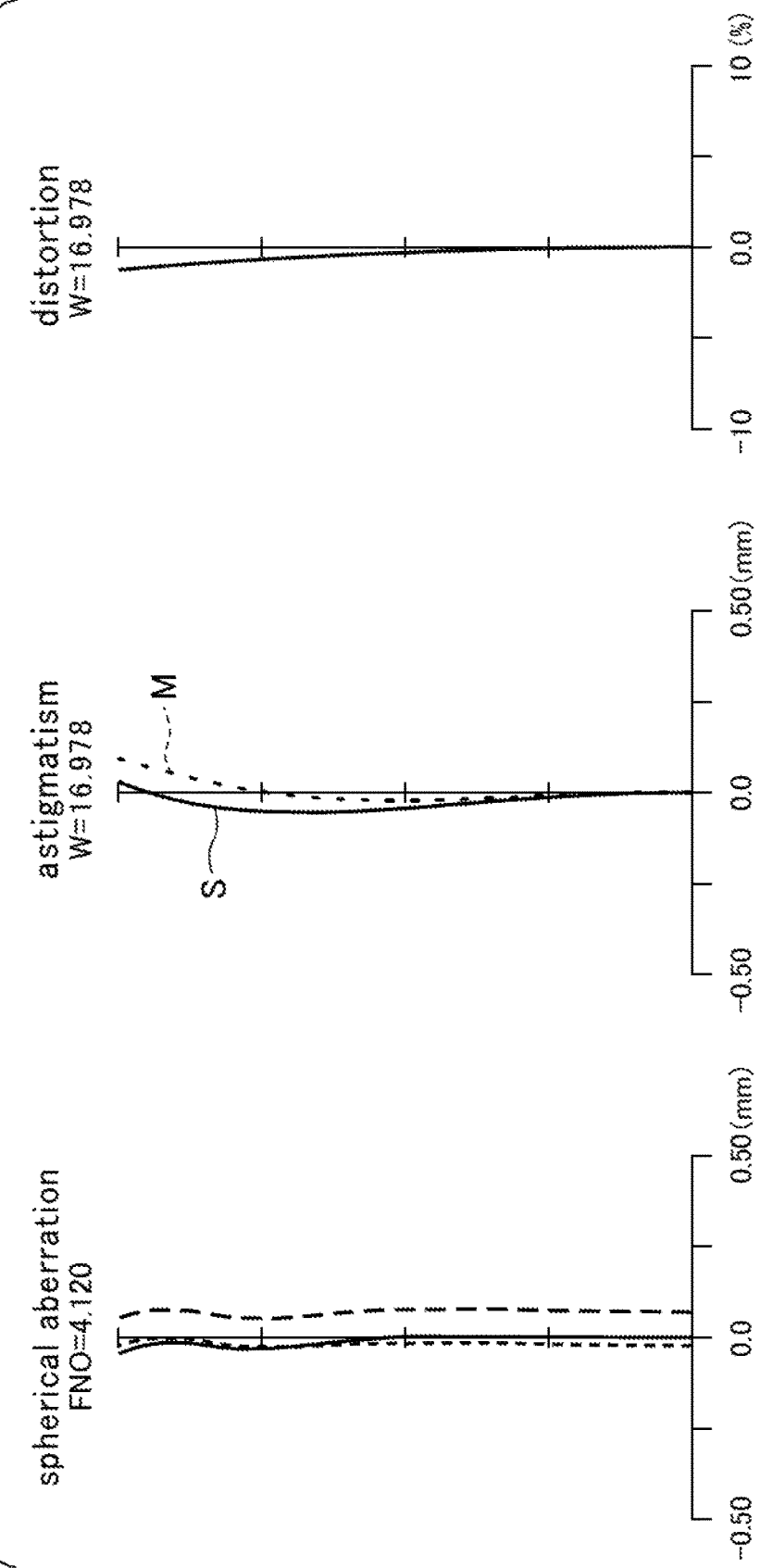

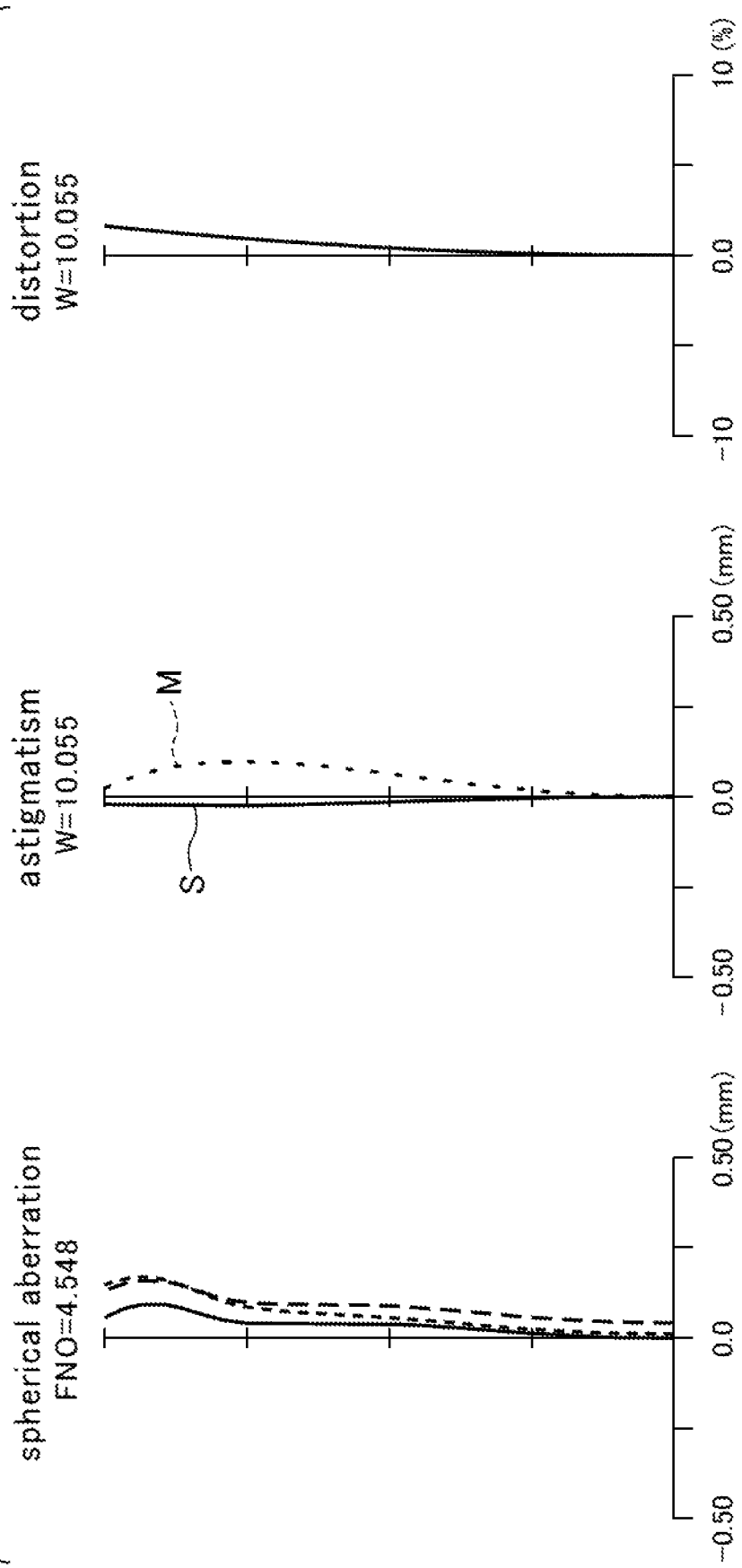

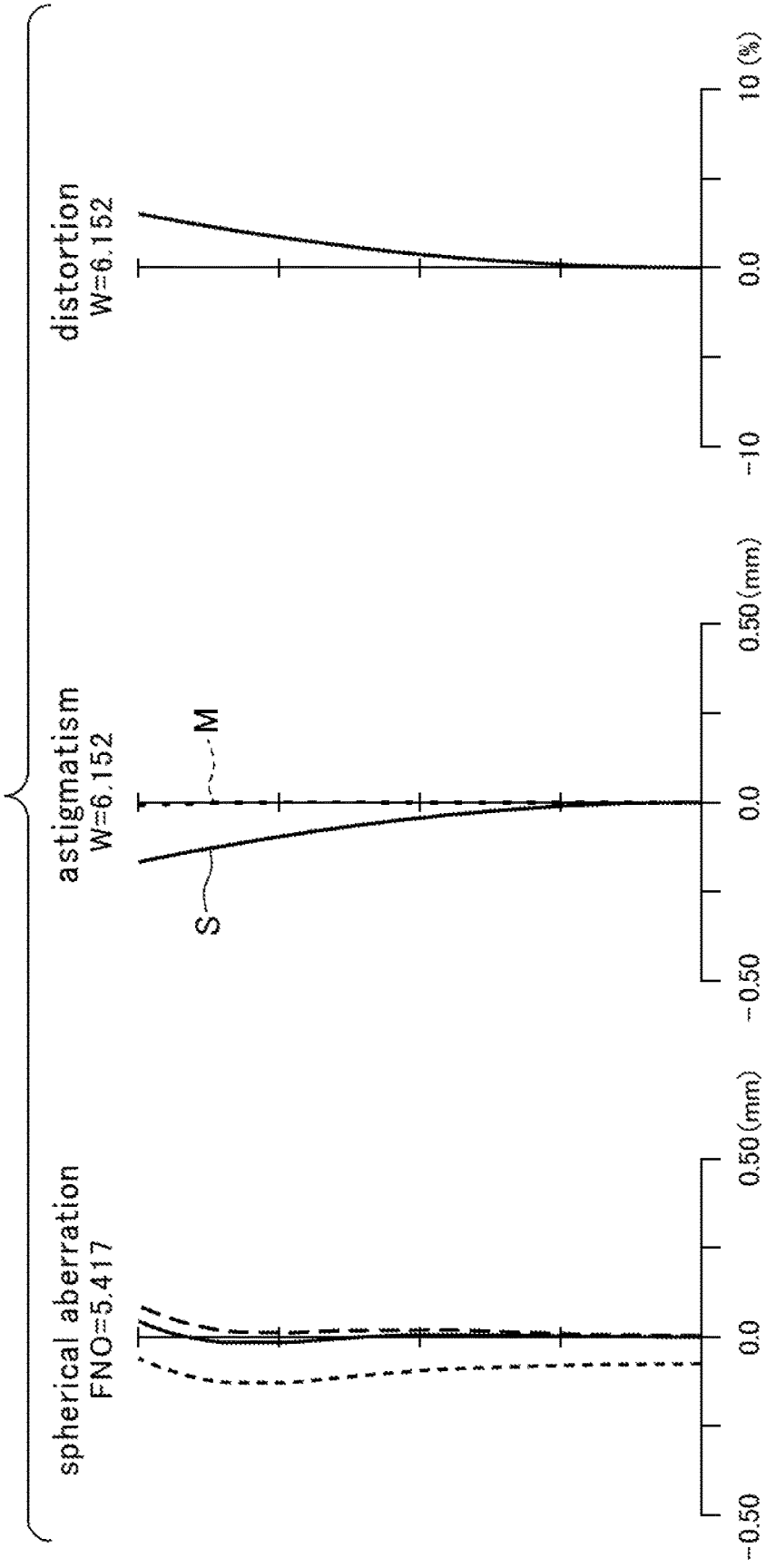

ZOOM LENS AND IMAGING APPARATUS

BACKGROUND OF THE INVENTION

1. Field of the Invention

The present invention relates to a zoom lens and an imaging apparatus equipped with the zoom lens.

2. Description of the Related Art

In a zoom lens, particularly in a zoom lens for a single-lens reflex camera, a reflex mirror (swing-up mirror) is disposed in the camera body, hence a predetermined value or longer flange back distance is required to house the oscillating mirror and allow upward and downward movement without interference. This flange back distance must have a predetermined value or longer length, regardless of the focal length.

In the prior art, for the purpose of providing a predetermined value or longer flange back distance, a positive lens group is disposed in a lens group located in the rear part of the zoom lens. For current compact camera bodies, digital still cameras, etc., however, zoom lenses that do not require, and do not have, a long flange back distance have begun to be manufactured and sold.

On the other hand, various zoom lenses having a focus lens group decreased in size, or equipped with a camera shake correction lens, namely an anti-vibration which is required to correct camera shake, are now being manufactured and sold as specialized zoom lenses for video filming or the like.

Particularly, when auto focus is continuously performed at high-speed, such as in the case of video filming, wobbling is performed by movement within a part of the lens group (the focus lens group) at high-speed in the optical axis direction. For wobbling, the focusing state is changed, as in the sequence non-focused state→focused state→non-focused state, and the signal components in a specific frequency band of a specific portion of an image region are detected from the output signals of the image sensor during this change, whereby an optimum position of the focus lens group in the focused state is computed. By moving the focus lens group to this optimum position, the focusing operation is performed. In order to implement this wobbling efficiently at high-speed, it is extremely effective to decrease the size and weight of the focus lens group.

Since current camera bodies are being downsized and flange back distances shortened, a decrease in size of auto focus zoom lenses is now in strong demand. To downsize an auto focus zoom lens, it is effective to reduce the diameter of the focus lens group. Moreover, to increase the focusing speed, it is effective to make the focus lens group lighter in addition to reducing the diameter of the focus lens group.

In the case of a zoom lens having a camera shake correction lens as well, it is effective to make the camera shake correction lens group lighter in addition to reducing the diameter of the camera shake correction lens group, in order to decrease the driving load of the camera shake correction driving system, which is used for decreasing the influence of camera shake contributing to image deterioration.

Conventionally, a photoelectric conversion element (image sensor), which receives an optical image and converts it into an electric image signal, encloses an on-chip micro-lens or the like to receive incident light efficiently. This means that the inclination angle of the incident light to the photoelectric conversion element, with respect to the optical axis, is restricted. Conventionally, this restriction was satisfied by increasing the exit pupil diameter of the zoom lens to reach or exceed a predetermined value, so as to decrease the inclination angle of the incident light with respect to the optical axis, that is, securing telecentricity of the incident luminous flux that enters the image sensor. For example, one of the conventional methods for securing the telecentricity is to dispose a positive lens group in the rear part of the zoom lens.

In recent image sensors, however, aperture ratios have been improved, that is, the light receiving angle has been expanded, and the optical performance of the on-chip micro-lens has been improved, which lessens the restrictions on the position of the exit pupil and the size demanded for the zoom lens. For example, even if a negative lens group is disposed in the rear part of the zoom lens so that the luminous flux enters the optical axis of the image sensor obliquely, peripheral darkening (shading), due to the mismatch of the on-chip micro-lens and the exit pupil of the zoom lens, does not standout noticeably.

Moreover, recent years have witnessed advancement and improvements in software and camera systems. As a result, the problems generated by distortion can nowadays be eliminated or minimized by image signal processing, while with conventional technologies, extensive distortion causes major problems in image forming performance.

SUMMARY OF THE INVENTION

Problems to be Solved by the Invention

Embodiment 2 of a variable power optical system disclosed in Japanese Patent Application Laid-Open No. H10-62688 proposes a zoom lens constituted at least by, in order from an object side: a first lens group G1 having positive refractive power; a second lens group G2; and a third lens group G3 having negative refractive power. However, in the case of Embodiment 2, an aperture stop or a lens group, which includes an aperture stop, largely moves toward the object at the time of zooming from the wide-angle end state to the telephoto end state, and it is difficult to implement brightness beyond F-number 11 in the telephoto end side.

Embodiments 2, 3, and 6 of a zoom lens system disclosed in Japanese Patent Application Laid-Open No. 2012-83702 propose a zoom lens system constituted by, in order from an object side to an image side: a first lens group having positive power; a second lens group having positive power; and at least two subsequent lens groups. However, in the case of the zoom lens system of Japanese Patent Application Laid-Open No. 2012-83702, an aperture stop or a lens group, which includes an aperture stop, largely moves toward the object at the time of zooming from the wide-angle end state to the telephoto end state, and it is difficult to implement brightness beyond F-number 5.77 in the telephoto end side.

Embodiment 5 of a zoom lens disclosed in Japanese Patent Application Laid-Open No. 2013-142781 proposes a zoom lens constituted by, in order from an object side to an image side: a front group which includes a first lens group having positive refractive power and a second lens group having positive or negative refractive power; and a rear group which includes a reflection mirror for deflecting the optical path and two or more lens groups. However, since the ratio of the total lens length, with respect to the focal length in the wide-angle end state in particular, is large, sufficient downsizing cannot be performed. Furthermore, an aperture stop or a lens group, which includes an aperture stop, largely moves toward the object at the time of zooming from the wide-angle end state to the telephoto end state, and it is difficult to implement brightness beyond F-number 5.49 in the telephoto end side.

Embodiments 1, 2, 3 and 4 of a telephoto zoom lens disclosed in Japanese Patent No. 5518530 present a zoom lens constituted by, in order from an object side: a first lens group having positive refractive power; a second lens group having positive refractive power; a third lens group having negative refractive power; a fourth lens group having positive refractive power; and a fifth lens group having negative refractive power. However, a lens group that moves at the time of zooming is the first lens group which has a larger diameter and that is heavier than the other lens groups. Therefore a large load is applied to the zoom mechanism, and it is difficult to decrease the weight and the diameter of the entire zoom lens.

OBJECT OF THE INVENTION

With the foregoing in view, it is an object of the present invention to provide a zoom lens that is compact in general and has an F-number to implement brightness even in the telephoto end side, and an imaging apparatus equipped with the zoom lens.

Means of Solving the Problem

A zoom lens according to the present invention is a zoom lens constituted by, in order form an object side: a first lens group having positive refractive power; a second lens group having positive refractive power: a third lens group having negative refractive power; and a fourth lens group having positive refractive power. At the time of zooming from a wide-angle end state to a telephoto end state, the third lens group moves so that the distance between the second lens group and the third lens group increases and the distance between the third lens group and the fourth lens group decreases. The moving distance of each lens group based on the image plane from the wide-angle end state to the telephoto end state satisfies the following conditional formula (1) when movement to the object side is positive and the image side is negative:

$$-4.500 \leq m1/m3 \leq 0.000 \quad (1)$$

where
m1: moving distance of the first lens group
m3: moving distance of the third lens group.

An imaging apparatus according to the present invention is an imaging apparatus having: a zoom lens; and an image pickup element configured to convert a formed optical image into an electric signal. The zoom lens is constituted by, in order from an object side: a first lens group having positive refractive power; a second lens group having positive refractive power; a third lens group having negative refractive power; and a fourth lens group having positive refractive power. At the time of zooming from a wide-angle end state to a telephoto end state, the third lens group moves so that the distance between the second lens group and the third lens group increases, and the distance between the third lens group and the fourth lens group decreases. The moving distance of each lens group based on the image plane from the wide-angle end state to the telephoto end state satisfies the following conditional formula (1) when the object side is positive and the image side is negative:

$$-4.500 \leq m1/m3 \leq 0.000 \quad (1)$$

where
m1: moving distance of the first lens group
m3: moving distance of the third lens group.

The present invention can provide a zoom lens that is compact in general and has an F-number to implement brightness even in the telephoto end side, and an imaging apparatus equipped with the zoom lens.

BRIEF DESCRIPTION OF THE DRAWINGS

FIG. 1a shows the wide-angle end zoom state and movement of each lens group at the time of zooming, FIG. 1b shows the intermediate zoom state, and FIG. 1c shows the telephoto end zoom state;

FIG. 2 are graphs showing the longitudinal aberrations of the zoom lens according to Embodiment 1 of the present invention in the wide-angle end zoom state;

FIG. 3 are graphs showing the longitudinal aberrations of the zoom lens according to Embodiment 1 of the present invention in the intermediate zoom state;

FIG. 4 are graphs showing the longitudinal aberrations of the zoom lens according to Embodiment 1 of the present invention in the telephoto end zoom state;

FIG. 5 are graphs showing the lateral aberrations of the zoom lens according to Embodiment 1 of the present invention in the telephoto end zoom state in the case when camera shake correction by the first camera shake correction lens VC1 in the fourth lens group was not performed (left), and in the case when this camera shake correction was performed (right);

FIG. 6 are graphs showing the lateral aberrations of the zoom lens according to Embodiment 1 of the present invention in the telephoto end zoom state in the case when camera shake correction by the second camera shake correction lens VC2 in the sixth lens group was not performed (left), and in the case when this camera shake correction was performed (right);

FIG. 7a shows the wide-angle end zoom state and movement of each lens group at the time of zooming, FIG. 7b shows the intermediate zoom state, and FIG. 7c shows the telephoto end zoom state;

FIG. 8 are graphs showing the longitudinal aberrations of the zoom lens according to Embodiment 2 of the present invention in the wide-angle end zoom state;

FIG. 9 are graphs showing the longitudinal aberrations of the zoom lens according to Embodiment 2 of the present invention in the intermediate zoom state;

FIG. 10 are graphs showing the longitudinal aberrations of the zoom lens according to Embodiment 2 of the present invention in the telephoto end zoom state;

FIG. 11 are graphs showing the lateral aberrations of the zoom lens according to Embodiment 2 of the present invention in the telephoto end zoom state in the case when camera shake correction by the first camera shake correction lens VC1 in the fourth lens group was not performed (left), and in the case when this camera shake correction was performed (right);

FIG. 13a shows the wide-angle end zoom state and movement of each lens group at the time of zooming, FIG. 13b shows the intermediate zoom state, and FIG. 13c shows the telephoto end zoom state;

FIG. 14 are graphs showing the longitudinal aberrations of the zoom lens according to Embodiment 3 of the present invention in the wide-angle end zoom state;

FIG. 18a to 18c are optical cross-sectional views depicting a zoom lens according to Embodiment 4 of the present invention, where FIG. 18a shows the wide-angle end zoom state and movement of each lens group at the time of zooming, FIG. 18b shows the intermediate zoom state, and FIG. 18c shows the telephoto end zoom state;

FIG. 19 are graphs showing the longitudinal aberrations of the zoom lens according to Embodiment 4 of the present invention in the wide-angle end zoom state;

FIG. 23a shows the wide-angle end zoom state and movement of each lens group at the time of zooming, FIG. 23b shows the intermediate zoom state, and FIG. 23c shows the telephoto end zoom state;

FIG. 24 are graphs showing the longitudinal aberrations of the zoom lens according to Embodiment 5 of the present invention in the wide-angle end zoom state;

FIG. 25 are graphs showing the longitudinal aberrations of the zoom lens according to Embodiment 5 of the present invention in the intermediate zoom state;

FIG. 26 are graphs showing the longitudinal aberrations of the zoom lens according to Embodiment 5 of the present invention in the telephoto end zoom state;

DESCRIPTION OF THE PREFERRED EMBODIMENTS

Figure 1A:
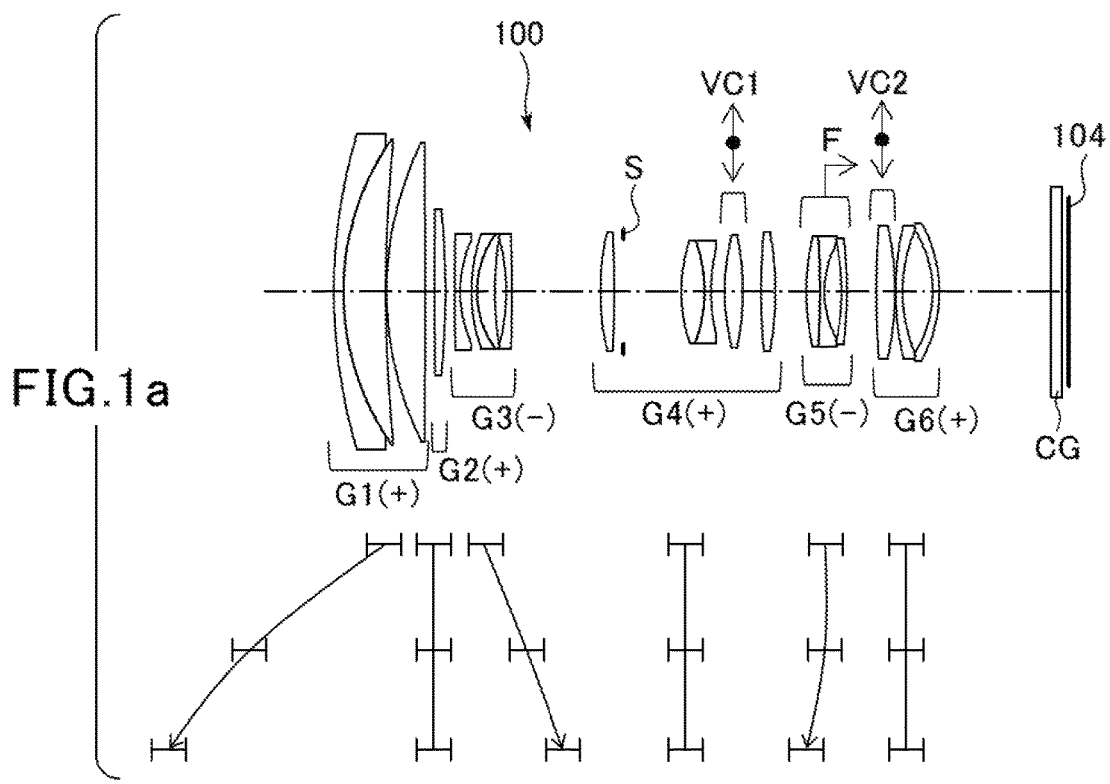
FIG. 1a to 1c are optical cross-sectional views depicting a zoom lens according to Embodiment 1 of the present invention, where

Embodiments of the zoom lens of the present invention will now be described.

A zoom lens according to an aspect of the present invention is constituted by, in order from an object side: a first lens group having positive refractive power; a second lens group having positive refractive power; a third lens group having negative refractive power; and a fourth lens group having positive refractive power. At the time of zooming from a wide-angle end state to a telephoto end state, the third lens group moves so that the distance between the second lens group and the third lens group increases, and the distance between the third lens group and the fourth lens group decreases. The moving distance of each lens group based on the image plane from the wide-angle end state to the telephoto end state satisfies the following conditional formula (1) when movement to the object side is positive and the image side is negative:

$$-4.500 \leq m1/m3 \leq 0.000 \quad (1)$$

where
m1: moving distance of the first lens group
m3: moving distance of the third lens group.

In other words, the zoom lens according to this aspect of the present invention has a zoom lens configuration of at least positive, positive, negative and positive in order from the object side, whereby more positive lens groups are disposed on the object side. As a result, creating a telephoto lens becomes easier and the ratio of the total lens length with respect to the focal length can be decreased, that is, downsizing becomes possible. The zoom lens according to this aspect of the invention is especially suitable for a telephoto zoom lens, but there can also be provided a zoom lens, the total length of which is short for any focal length region.

The conditional expression (1) specifies the ratio of the moving distance of the third lens group and the moving distance of the first lens group. If the value of this ratio is below the lower limit, the moving distance of the first lens group increases. Since the first lens group has a wider diameter and heavier weight than the other lens groups, a lens driving mechanism having a robust driving force is required to largely move this first lens group, which makes downsizing of the zoom lens difficult. If the value of this ratio exceeds the upper limit, on the other hand, the first lens group and the third lens group move in the same direction. If the first lens group and the third lens group move toward the object, the fourth lens group also moves toward the object. This makes it difficult to maintain an F-number to implement brightness in the telephoto end side. If the first lens group and the third lens group move toward the image, it becomes difficult to increase the zoom ratio.

The moving distance of each lens group based on the image plane from the wide-angle end state to the telephoto end state means the moving distances of each of the first lens group to the fourth lens group from the wide-angle end position to the telephoto end position, at the time of zooming from a wide-angle end state to a telephoto end state.

The conditional formula (1) is more preferably $$-4.400 \leq m1/m3 \leq 0.000$$

and is even more preferably $$-4.300 \leq m1/m3 \leq 0.000.$$

In the zoom lens according to an aspect of the present invention, it is preferable that the conditional formula (2) is satisfied:

$$0.700 \leq f12w/fw \leq 2.300 \tag{2}$$

where
f12w: composite focal length of the first lens group and the second lens group in the wide-angle end state
fw: focal length in the wide-angle end state.

The conditional formula (2) specifies the ratio of the composite focal length of the first lens group and the second lens group in the wide-angle end state with respect to the focal length in the wide-angle end state. If both the first lens group and the second lens group are positive lens groups, and if the power of both lens groups is increased, then the total length of the optical system can be decreased, however correction of aberrations becomes difficult, therefore the conditional formula (2) specifies an optimum condition.

If this value is below the lower limit, power of the first lens group and the second lens group becomes strong in the wide-angle end state and correction of aberrations becomes difficult, and as a result it becomes difficult to correct various aberrations well, including longitudinal chromatic aberration, lateral chromatic aberration and coma aberration, in both the first lens group and the second lens group. If this value exceeds the upper limit, on the other hand, power of the first lens group and the second lens group becomes weak in the wide-angle end state, and creating a telephoto lens becomes difficult, therefore it becomes difficult to decrease the total length of the zoom lens, particularly in the wide-angle end state.

The conditional formula (2) is more preferably $$0.800 \leq f12w/fw \leq 2.100$$

and is even more preferably $$0.900 \leq f12w/fw \leq 1.900.$$

In the zoom lens according to an aspect of the present invention, it is preferable that the conditional formula (3) is satisfied:

$$0.800 \leq f1/\sqrt{(fw \times ft)} \leq 2.000 \tag{3}$$

where
f1: focal length of the first lens group
ft: focal length in the telephoto end state.

The conditional formula (3) specifies the ratio of the focal length of the first lens group with respect to the effective focal length of the entire zoom lens. If the power of the first lens group, which is a positive lens group, is increased, the total length of the zoom lens can be decreased, however it becomes difficult to correct aberrations, therefore the conditional formula (3) specifies an optimum condition.

If this value is below the lower limit, the power of the first lens group increases, and it becomes difficult to correct aberrations, leading to the difficulty of correcting such aberrations as longitudinal chromatic aberration, lateral chromatic aberration and coma aberration well in the first lens group. If this value exceeds the upper limit, the power of the first lens becomes weak, and creating a telephoto lens becomes difficult, and as a result, it becomes difficult to decrease the total length.

The conditional formula (3) is more preferably $$1.000 \leq f1/\sqrt{(fw \times ft)} \leq 1.800$$

and is even more preferably $$1.200 \leq f1/\sqrt{(fw \times ft)} \leq 1.600.$$

In the zoom lens according to an aspect of the invention, it is preferable that the following conditional formula (4) is satisfied:

$$0.500 \leq |(ft/fw)/(b3t/b3w)| \leq 2.000 \tag{4}$$

where
b3t: lateral magnification of the third lens group in the telephoto end state
b3w: lateral magnification of the third lens group in the wide-angle end state.

The conditional formula (4) specifies the zoom ratio of the entire optical system with respect to the magnification change of the third lens group. In the zoom lens, according to this aspect of the present invention, the magnification change caused by the movement of the third lens group is used for changing the zoom ratio in order to utilize the magnification change effectively. As a result, more lens groups can be fixed with respect to the image plane at the time of zooming. In other words, compared with conventional zoom lenses where more lens groups move at the time of zooming, the zoom mechanism can be simplified and downsized, and deterioration of designed performance, which is generated after assembly due to the influence of relative decentering of each lens group, can be minimized. The conditional formula (4) specifies the optimum condition of the magnification change of the third lens group.

If this value is below the lower limit, it means that there is a lens group, other than the third lens group, that decreases the magnification at the time of zooming from the wide-angle end state to the telephoto end state, hence decreasing the number of lens groups or number of lenses and downsizing become difficult. If this value exceeds the upper limit, on the other hand, a lens group, other than the third lens group, that increases the magnification, is required, hence more lens groups must be moved at the time of zooming, and the moving distance also increases, which makes it difficult to implement downsizing and lighter weight.

The conditional formula (4) is more preferably $$0.650 \leq |(ft/fw)/(b3t/b3w)| \leq 1.700$$

and is even more preferably $$0.800 \leq |(ft/fw)/(b3t/b3w)| \leq 1.500.$$

In the zoom lens according to an aspect of the present invention, it is preferable that a focus lens group, which performs focusing, is included, and the following conditional formula (5) is satisfied:

$$-0.500 \leq ff/\sqrt{(fw \times ft)} \leq -0.100 \tag{5}$$

where
ff: focal length of the focus lens group.

The conditional formula (5) specifies the ratio of the focal length of the focus lens group with respect to the effective focal length of the entire zoom lens.

If this value is below the lower limit, the power of the focus lens group becomes strong, and more lens groups must be used for correcting aberrations, hence downsizing and lighter weight cannot be implemented for a focus lens group. If this value exceeds the upper limit, on the other hand, the power of the focus lens group becomes weak, and the moving distance of the lenses at the time of focusing increases, which makes it difficult to decrease the total length of the optical system.

The focus lend group may consist of at least a lens included in one of the first to the fourth lens groups or at least a lens included in any other lens group than the first to the fourth lens groups, for example, the fifth lens group. Namely, the focus lens group is not limited herein.

The conditional formula (5) is more preferably $$-0.400 \leq ff/\sqrt{(fw \times ft)} \leq -0.150$$

and is even more preferably $$-0.350 \leq ff/\sqrt{(fw \times ft)} \leq -0.180.$$

In the zoom lens according to an aspect of the present invention, it is preferable that a camera shake correction lens group, which corrects camera shake by moving vertically to the optical axis, is included, and the following conditional formula (6) is satisfied;

$$0.100 \leq |fv|/ft \leq 0.500 \quad (6)$$

where fv: focal length of the camera shake correction lens group.

The conditional formula (6) specifies the ratio of the focal length of the camera shake correction lens group with respect to the focal length in the telephoto end state.

If this value is below the lower limit, the power of the camera shake correction lens group becomes strong and more lenses must be used for correcting aberrations, hence downsizing and lighter weight cannot be implemented for the camera shake correction lens group. If this value exceeds the upper limit, on the other hand, the power of the camera shake correction lens group becomes weak, and the moving distance of the lenses at the time of correcting camera shake increases, which makes it difficult to decrease the outer diameter of the zoom lens.

The camera shake correction lens group may consist of at least a lens included in one of the first to the fourth lens groups or at least a lens included in any other lens group than the first to the fourth lens groups, for example, the fifth lens group. Namely, the camera shake correction lens group is not limited herein.

The conditional formula (6) is more preferably $$0.130 \leq |fv|/ft \leq 0.400$$

and is even more preferably $$0.160 \leq |fv|/ft \leq 0.300.$$

In the zoom lens, according to an aspect of the present invention, it is preferable that the camera shake correction lens group is fixed with respect to the image plane at the time of zooming.

The camera shake correction lens group, which is substantially integrated with a camera shake correction mechanism component, is large and heavy. Therefore it is preferable that the camera shake correction lens group is a lens group that is fixed with respect to the image plane at the time of zooming, or is a part of such a lens group. If this large and heavy camera shake correction mechanism component is moved at the time of zooming, the zoom mechanism becomes complicated and large. If the camera shake correction lens group is a lens group that is fixed with respect to the image plane in the optical axis direction at the time of zooming, or is a part of such a lens group, then the size of the camera shake correction mechanism component in the outer diameter direction in particular can be decreased.

An imaging apparatus according to an aspect of the present invention is constituted by: a zoom lens; and an image pickup element configured to convert a formed optical image into electric signals. The zoom lens is constituted by, in order from an object side: a first lens group having positive refractive power; a second lens group having positive refractive power; a third lens group having negative refractive power; and a fourth lens group having positive refractive power. At the time of zooming from a wide-angle end state to a telephoto end state, the third lens group moves so that the distance between the second lens group and the third lens group increases, and the distance between the third lens group and the fourth lens group decreases. The moving distance of each lens group based on the image plane from the wide-angle end state to the telephoto end state satisfies the following conditional formula (1) when the object side is positive and the image side is negative:

$$-4.500 \leq m1/m3 \leq 0.000 \quad (1)$$

where m1: moving distance of the first lens group m3: moving distance of the third lens group.

The imaging apparatus configured like this is an apparatus having excellent image performance and good usability, effectively utilizing the compactness of the zoom lens and the F-number to implement brightness even in the telephoto end side.

In the zoom lens, according to an aspect of the present invention, at the time of zooming from the wide-angle end state to the telephoto end state, the distance between the first lens group and the second lens group increases. This change of the distance between the first lens group and the second lens group at the time of zooming is not a requirement of the zoom lens of the present invention.

In the embodiment, the F-number in the wide-angle end state and the F-number in the telephoto end state are the same. However, the zoom lens can be downsized in the diameter direction if the F-numbers are set such that the telephoto end side become darker than the wide-angle end side. Instead, the F-numbers may be set such that the telephoto end side becomes brighter than the wide-angle end side. These are all included in the present invention.

In terms of the effect of correcting chromatic aberrations, it is preferable that the second lens group includes at least one positive lens, and this positive lens satisfies:

$$v2p \leq 55$$

where v2p denotes an Abbe number of at least one positive lens included in the second lens group based on the d-line.

Embodiments of the present invention will now be described with reference to the drawings.

In the table of each embodiment, r indicates a radius of curvature, d indicates a lens thickness or lens distance, nd indicates a refractive index at the d-line, and vd indicates an Abbe number based on the d-line.

An aspherical surface is defined by the following expression:

$$z = ch^2/[1+\{1-(1+k)c^2h^2\}^{1/2}] + A4h^4 + A6h^6 + A8h^8 + A10h^{10} \ldots$$

(where c denotes a curvature (1/r), h denotes a height from the optical axis, k denotes a conical coefficient, and A4, A6, A8, A10 . . . denotes an aspherical coefficient of each degree).

In each graph of longitudinal aberration, spherical aberration (SA (mm)), astigmatism (AST (mm)) and distortion (DIS (%)) are shown in order from the left. In the graph of aspherical aberration, the ordinate indicates the F-number (FNO in the graph), the solid line indicates the characteristic at the d line (d-line), the dotted line indicates characteristic at the g line (g-line), and the broken line indicates the characteristic at the C line (C-line). In the graph of astigmatism, the ordinate indicates an angle of view (W in the graph), the solid line indicates the characteristic on the sagittal plane (S in the graph), and the broken line indicates the characteristic on the meridional plane (M in the graph). In the graph of distortion, the ordinate indicates an angle of view (W in the graph).

In each graph of lateral aberration, the three graphs on the left show a basic state when camera shake correction is not performed in the telephoto end state, and the three graphs on the right show camera shake corrected state in the telephoto end state when the first camera shake correction lens VC1 of the fourth lens group 4 was moved by a predetermined distance in the vertical direction to the optical axis. In each graph of lateral aberration in the basic state, the top graph indicates the lateral aberration at an image point that is 70% of the maximum image height, the middle graph indicates the lateral aberration at an axial image point, and the bottom graph indicates the lateral aberration at an image point that is −70% of the maximum image height.

In each graph of lateral aberration in the camera shake corrected state, the top graph indicates the lateral aberration at an image point that is 70% of the maximum image height, the middle graph indicates the lateral aberration at an axial image point, and the bottom graph indicates the lateral aberration at an image point that is −70% of the maximum image height. In each graph of lateral aberration, the abscissa indicates a distance from the principal ray on the pupil surface, and the solid line indicates the characteristic at the d line (d-line), the dotted line indicates the characteristic at the g line (g-line), and the broken line indicates the characteristic at the C line (C-line).

According to the zoom lens system of each embodiment, the moving distance of the first camera shake correction lens VC1 of the fourth lens group 4 in the vertical direction to the optical axis in the telephoto end state, when the camera shake is corrected, is as follows.
Embodiment 1 0.604 mm
Embodiment 2 0.348 mm
Embodiment 3 0.448 mm
Embodiment 4 0.409 mm
Embodiment 5 0.658 mm In the telephoto end state where the photographing distance is ∞, the image decentration amount, when the zoom lens system is inclined 0.3°, is the same as the image decentration amount when the camera shake correction lens group moves in parallel with the vertical direction to the optical axis by each value mentioned above.

As clearly shown by each graph of lateral aberration related to camera shake correction using the first camera shake correction lens VC1, symmetry of lateral aberration at the axial image point is good. In comparison with the lateral aberration at the +70% image point with the −70% image point in the basic state, both of these cases have a small degree of curvature and almost the same inclination of the aberration curve, that is, the decentration coma aberration and decentration astigmatism are small. This means that sufficient image forming performance is implemented even in the camera shake corrected state.

If the camera shake correction angle of the zoom lens system is the same, the parallel moving distance required for camera shake correction decreases as the focal length of the entire zoom lens system decreases. Therefore regardless of the zoom position, camera shake can be sufficiently corrected for a camera shake correction angle not exceeding 0.3° without dropping the image forming performance. Moreover, the camera shake correction angle can be larger than 0.3°, if the parallel moving distance of the camera shake correction lens in the telephoto end state is applied to the wide-angle end state and the intermediate focal length state.

Figure 1B:
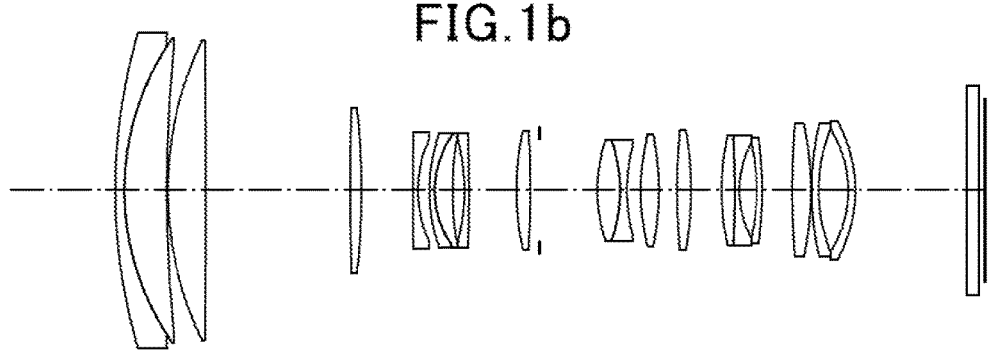
Figure 1C:
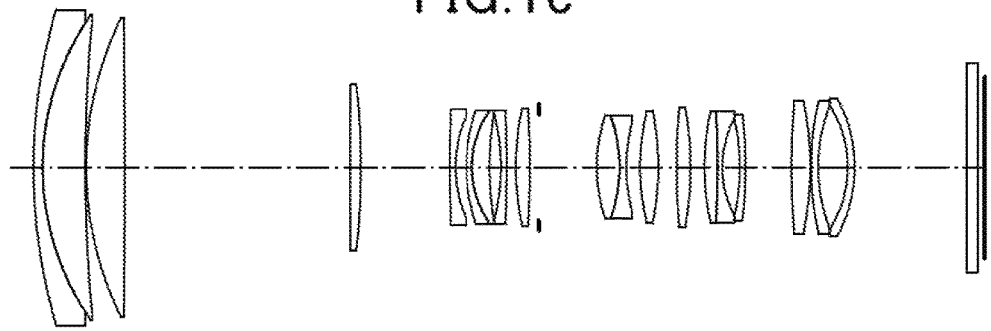
Figure 7A:
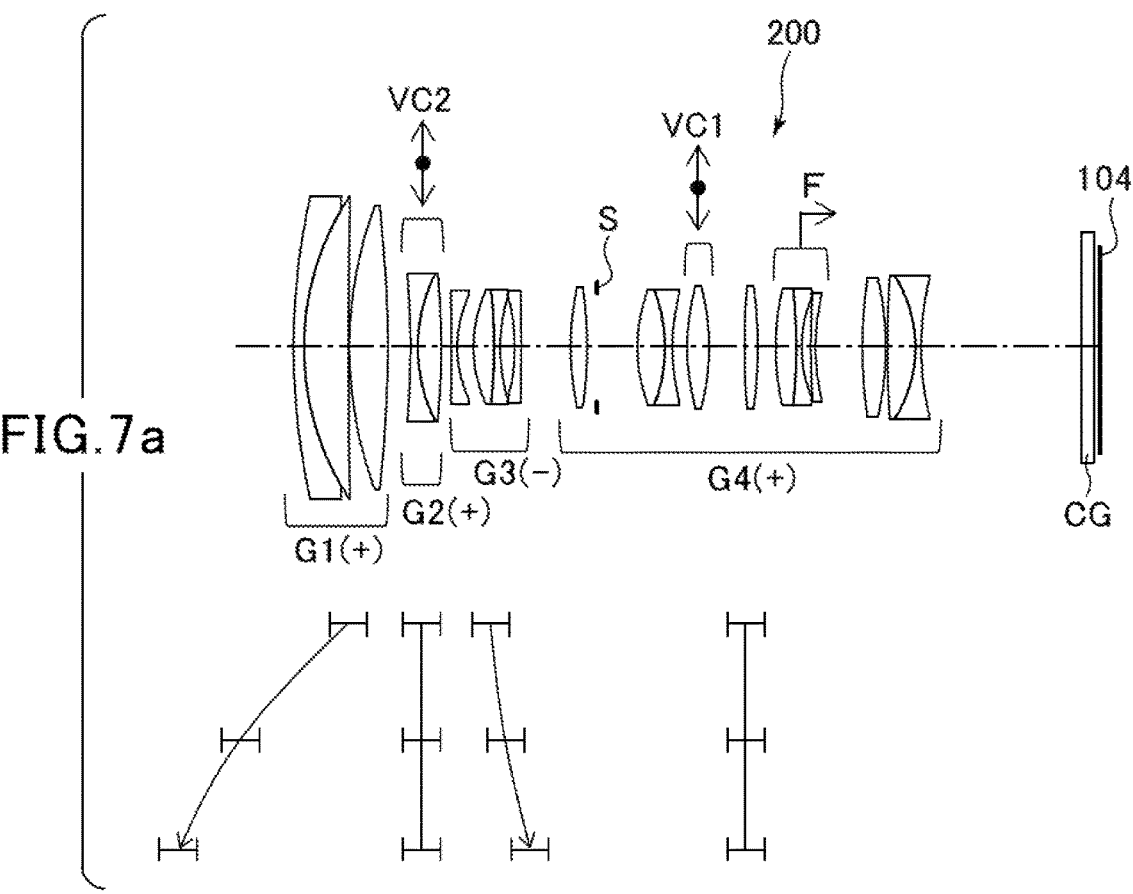
FIG. 7a to 7c are optical cross-sectional views depicting a zoom lens according to Embodiment 2 of the present invention, where
Figure 7B:
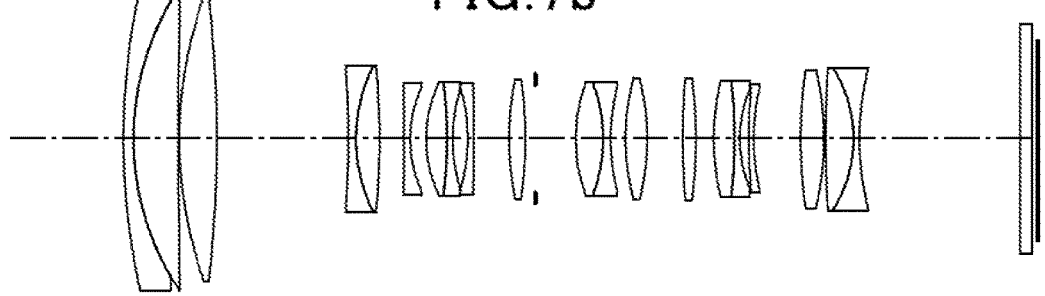
Figure 7C:
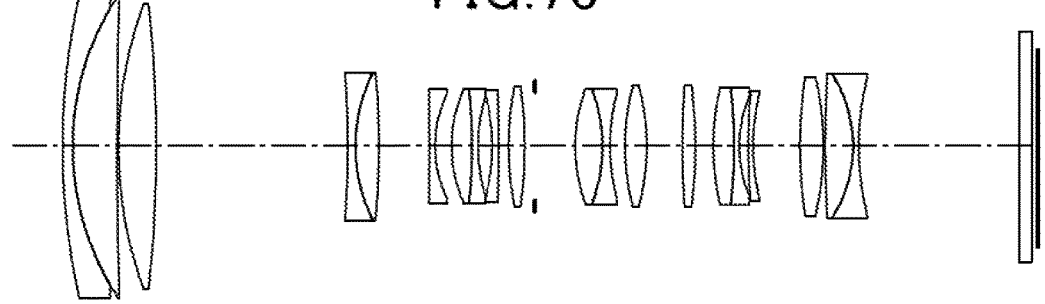

The camera shake correction lens according to Embodiments 1 to 4 is disposed in the fourth lens group, but the position of the camera shake correction lens is not limited to the fourth lens group. The effect of the camera shake correction can be demonstrated well even if the camera shake correction lens is disposed in a lens group other than the fourth lens group. In Embodiment 1 and 2, a second camera shake correction lens VC2, which is used instead of the first camera shake correction lens VC1, is shown in FIG. 1 and FIG. 7. According to the zoom lens systems of Embodiments 1 and 2, the moving distance of the second camera shake correction lens VC2 in the vertical direction to the optical axis in the telephoto end state when the camera shake is corrected is as follows.
Embodiment 1 0.270 mm
Embodiment 2 0.193 mm In the telephoto end state where the photographing distance is ∞, the image decentration amount, when the zoom lens system is inclined by 0.05°, is the same as the image decentration amount when the camera shake correction lens moves in parallel with the vertical direction to the optical axis by each value mentioned above.

As clearly shown by each graph of lateral aberration related to camera shake correction using the second camera shake correction lens VC2, symmetry of lateral aberration at the axial image point is good. In comparison with the lateral aberration at the +70% image point with the −70% image point in the basic state, both of these cases have a small degree of curvature and almost the same inclination of the aberration curve, that is, decentration coma aberration and decentration astigmatism are minimal. This means that a sufficient image forming performance is implemented even in the camera shake correction state.

As described above, according to the embodiment of the present invention, camera shake correction can be performed without dropping the image forming characteristic, no matter which lens group or which part of a lens group the camera shake correction is disposed.

Embodiment 1

A zoom lens according to Embodiment 1 will be described with reference to the drawings. FIG. 1 are diagrams depicting the lens configuration in the wide-angle end zoom state, in the intermediate zoom state, and the telephoto end zoom state respectively, and FIG. 2 to FIG. 4 are graphs showing the longitudinal aberrations in the wide-angle end zoom state, the intermediate zoom state, and the telephoto end zoom state respectively. FIG. 5 are graphs showing the lateral aberrations when camera shake is corrected using the first camera shake correction lens VC1 in the telephoto end zoom state. FIG. 6 are graphs showing the lateral aberrations when camera shake is corrected using the second camera shake correction lens VC2 in the telephoto end zoom state. Table 1 to Table 5 show numeric data thereof. In this example, the second lens group, the fourth lens group, and the sixth lens group are fixed with respect to the image plane at the time of zooming.

As depicted in FIG. 1, the zoom lens 100 has a first lens group G1, a second lens group G2, a third lens group G3, a fourth lens group G4, a fifth lens group G5, and a sixth lens group G6. The fifth lens group G5 is a focus lens group F. The fourth lens group G4 includes an aperture stop S and the first camera shake correction lens VC1. The sixth lens group G6 includes the second camera shake correction lens VC2. A light receiving element 104 is disposed at an image forming position, and an optical filter CG is disposed in the vicinity of the light receiving element on the object side thereof.

TABLE 1

Surface data

| Surface number | r | d | nd | vd |
|---|---|---|---|---|
| 1 | 120.000 | 2.000 | 1.8340 | 37.35 |
| 2 | 57.239 | 9.276 | 1.4970 | 81.61 |
| 3 | 320.539 | 0.200 | | |
| 4 | 73.168 | 8.392 | 1.4370 | 95.10 |
| 5 | −3965.989 | d5 | | |
| 6 | 1541.496 | 2.390 | 1.8467 | 23.78 |
| 7 | −170.858 | d7 | | |
| 8 | 492.161 | 1.200 | 1.8348 | 42.72 |
| 9 | 27.046 | 2.455 | | |
| 10 | 36.916 | 1.200 | 1.5168 | 64.20 |
| 11 | 21.061 | 3.879 | 1.7618 | 26.61 |
| 12 | 68.978 | 2.509 | | |
| 13 | −44.669 | 1.200 | 1.9004 | 37.37 |
| 14 | −332.526 | d14 | | |
| 15 | 56.572 | 3.085 | 1.9108 | 35.25 |
| 16 | −211.213 | 2.000 | | |
| 17 | ∞ | 12.559 | | (Aperture stop) |
| 18 | 34.445 | 5.018 | 1.4970 | 81.61 |
| 19 | −32.165 | 1.500 | 1.9212 | 23.96 |
| 20 | 41.507 | 2.918 | | |
| 21* | 44.633 | 3.964 | 1.5831 | 59.46 |
| 22* | −63.990 | 4.011 | | |
| 23 | 140.427 | 3.065 | 2.0006 | 25.46 |
| 24 | −71.525 | d24 | | |
| 25 | 54.961 | 2.899 | 1.8467 | 23.78 |
| 26 | −211.629 | 1.000 | 1.9108 | 35.25 |
| 27 | 21.897 | 3.828 | | |
| 28 | −45.718 | 1.200 | 1.4970 | 81.61 |
| 29 | −96.685 | d29 | | |
| 30 | 186.962 | 4.049 | 1.8467 | 23.78 |
| 31 | −69.978 | 0.200 | | |
| 32 | 65.001 | 1.500 | 1.8348 | 42.72 |
| 33 | 35.194 | 6.473 | | |
| 34 | −24.851 | 1.500 | 1.8467 | 23.78 |
| 35 | −30.996 | 24.383 | | |
| 36 | ∞ | 2.500 | 1.5168 | 64.20 |
| 37 | ∞ | 1.000 | | |

*indicates aspherical surface

TABLE 2

Aspherical data (aspherical coefficient is 0.00 if not indicated)

| Surface number | k | A4 | A6 | A8 | A10 |
|---|---|---|---|---|---|
| 21 | 0.0000E+00 | −6.1788E−06 | −3.7337E−08 | 3.3864E−10 | −1.2294E−12 |
| 22 | 0.0000E+00 | 1.5086E−06 | −4.6567E−08 | 3.3627E−10 | −1.2105E−12 |

TABLE 3

Various data
Zoom ratio: 2.713, image height: 21.633

| | Wide angle | Intermediate | Telephoto |
|---|---|---|---|
| Focal length | 71.847 | 119.965 | 194.907 |
| F-number | 4.120 | 4.120 | 4.120 |
| Half angle of view | 15.900 | 9.349 | 5.764 |
| Total lens length | 160.000 | 189.533 | 207.221 |
| Back focus | 27.030 | 27.030 | 27.030 |
| d5 | 2.000 | 31.533 | 49.221 |
| d7 | 2.000 | 11.136 | 19.417 |
| d14 | 19.417 | 10.281 | 2.000 |
| d24 | 6.818 | 6.598 | 3.000 |
| d29 | 6.412 | 6.632 | 10.230 |

TABLE 4

Zoom lens group data

| Group | First surface | Focal length | Lens configuration length | Lens moving distance |
|---|---|---|---|---|
| 1 | 1 | 179.508 | 19.868 | 47.221 |
| 2 | 6 | 181.782 | 2.390 | 0.000 |
| 3 | 8 | −30.288 | 12.443 | −17.417 |
| 4 | 15 | 34.012 | 38.119 | 0.000 |
| 5 | 25 | −32.155 | 8.927 | 3.818 |
| 6 | 30 | 1493.890 | 13.722 | 0.000 |

TABLE 5

Magnification of zoom lens group (from front to rear)

| Group | First surface | Wide angle | Intermediate | Telephoto |
|---|---|---|---|---|
| 1 | 1 | 0.000 | 0.000 | 0.000 |
| 2 | 6 | 0.520 | 0.568 | 0.601 |
| 3 | 8 | −0.599 | −0.925 | −1.643 |
| 4 | 15 | −0.532 | −0.526 | −0.435 |
| 5 | 25 | 2.618 | 2.620 | 2.736 |
| 6 | 30 | 0.924 | 0.924 | 0.924 |

Embodiment 2

Figure 12:
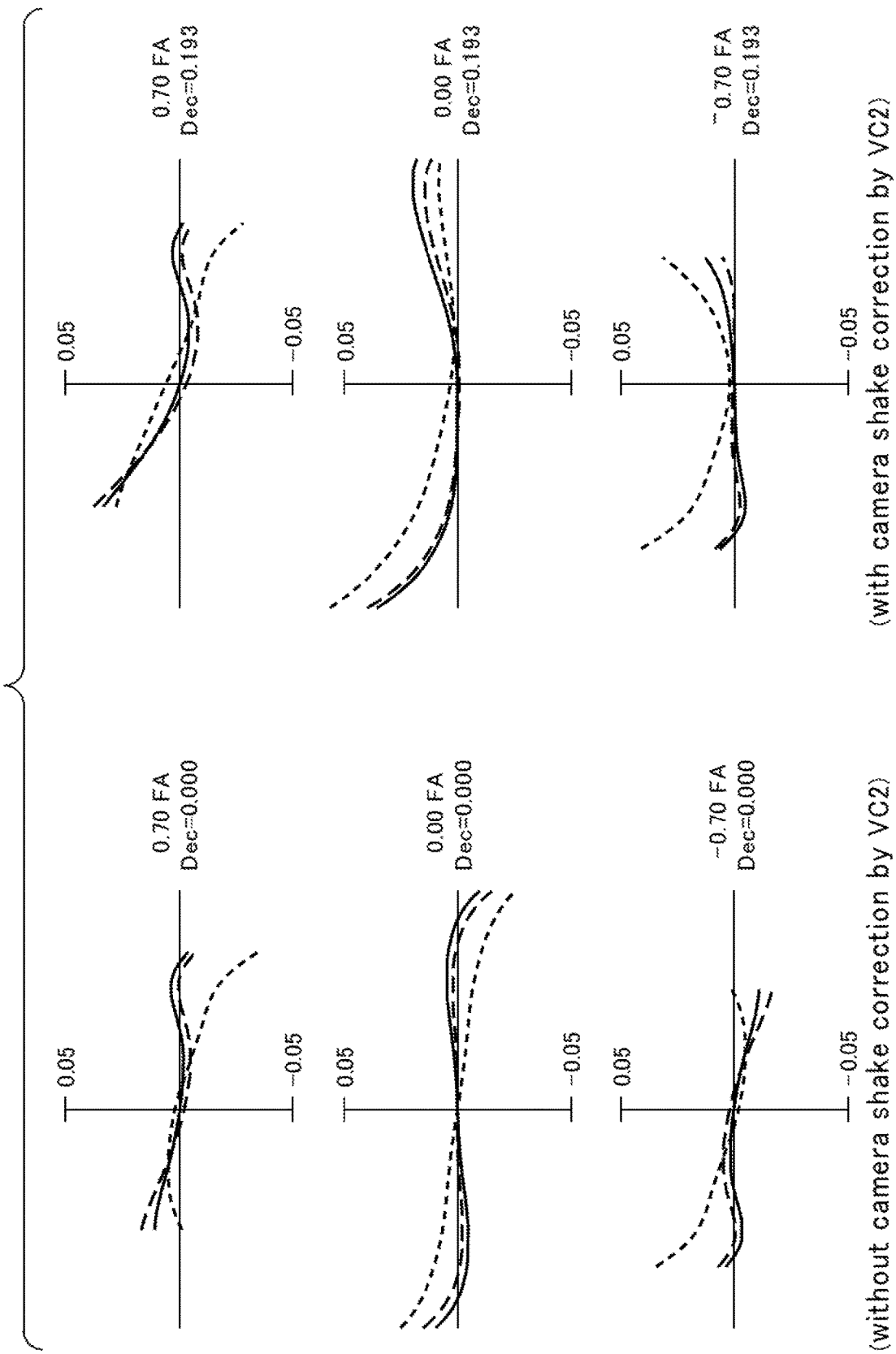
FIG. 12 are graphs showing the lateral aberrations of the zoom lens according to Embodiment 2 of the present invention in the telephoto end zoom state in the case when camera shake correction by the second camera shake correction lens VC2 in the second lens group was not performed (left), and in the case when this camera shake correction was performed (right)

A zoom lens according to Embodiment 2 will be described with reference to the drawings. FIG. 7 are diagrams depicting the lens configuration in the wide-angle end zoom state, in the intermediate zoom state, and the telephoto end zoom state respectively, and FIG. 8 to FIG. 10 are graphs showing the longitudinal aberrations in the wide-angle end zoom state, the intermediate zoom state, and the telephoto end zoom state respectively. FIG. 11 are graphs showing the lateral aberrations when camera shake is corrected using the first camera shake correction lens VC1 in the telephoto end zoom state. FIG. 12 are graphs showing the lateral aberrations when camera shake is corrected using the second camera shake correction lens VC2 in the telephoto end zoom state. Table 6 to Table 10 show the numeric data thereof. In this example, the second lens group and the fourth lens group are fixed with respect to the image plane at the time of zooming.

As depicted in FIG. 7, the zoom lens 200 has a first lens group G1, a second lens group G2, a third lens group G3, and a fourth lens group G4. The second lens group G2 includes the second camera shake correction lens VC2. The fourth lens group G4 includes an aperture stop S, the first camera shake correction lens VC1 and a focus lens group F. A light receiving element 104 is disposed at an image forming position, and an optical filter CG is disposed in the vicinity of the light receiving element on the object side thereof.

TABLE 6

Surface data

| Surface number | r | d | nd | vd | |
|---|---|---|---|---|---|
| 1 | 137.195 | 2.000 | 1.8042 | 46.50 | |
| 2 | 53.836 | 8.857 | 1.4970 | 81.61 | |
| 3 | 1361.666 | 0.200 | | | |
| 4 | 80.735 | 7.575 | 1.4370 | 95.10 | |
| 5 | −245.237 | d5 | | | |
| 6 | −187.353 | 1.500 | 1.8000 | 29.84 | |
| 7 | 32.151 | 4.633 | 1.9537 | 32.32 | |
| 8 | −156.561 | d8 | | | |
| 9 | −1002.391 | 1.200 | 1.8348 | 42.72 | |
| 10 | 24.352 | 3.225 | | | |
| 11 | 26.610 | 4.074 | 1.9212 | 23.96 | |
| 12 | −101.611 | 1.200 | 1.8061 | 40.73 | |
| 13 | 35.117 | 2.923 | | | |
| 14 | −35.554 | 1.233 | 1.9004 | 37.37 | |
| 15 | −570.719 | d15 | | | |
| 16 | 59.462 | 3.163 | 1.9108 | 35.25 | |
| 17 | −90.336 | 2.000 | | | |
| 18 | ∞ | 8.042 | | | (Aperture stop) |
| 19 | 32.198 | 5.422 | 1.4970 | 81.61 | |
| 20 | −31.031 | 1.500 | 1.9212 | 23.96 | |
| 21 | 41.197 | 2.953 | | | |
| 22* | 42.146 | 4.358 | 1.5831 | 59.46 | |
| 23* | −44.940 | 7.002 | | | |
| 24 | 134.487 | 2.649 | 2.0006 | 25.46 | |
| 25 | −86.916 | 3.524 | | | |
| 26 | 49.222 | 4.127 | 1.8467 | 23.78 | |
| 27 | −93.877 | 1.000 | 1.9108 | 35.25 | |
| 28 | 25.000 | 1.805 | | | |
| 29 | 132.747 | 1.000 | 1.9108 | 35.25 | |
| 30 | 46.194 | 9.428 | | | |
| 31 | 99.159 | 4.553 | 1.6477 | 33.84 | |
| 32 | −61.910 | 0.388 | | | |
| 33 | 221.563 | 5.513 | 1.4970 | 81.61 | |
| 34 | −26.088 | 1.200 | 1.6385 | 55.45 | |
| 35 | 56.870 | 31.770 | | | |
| 36 | ∞ | 2.500 | 1.5168 | 64.20 | |
| 37 | ∞ | 1.000 | | | |

*indicates aspherical surface

TABLE 7

Aspherical data (aspherical coefficient is 0.00 if not indicated)

| Surface number | k | A4 | A6 | A8 | A10 |
|---|---|---|---|---|---|
| 22 | 0.0000E+00 | −8.4644E−06 | −1.3698E−08 | 1.9828E−10 | −9.3027E−13 |
| 23 | 0.0000E+00 | 2.1489E−06 | −2.6950E−08 | 2.2427E−10 | −1.0171E−12 |

TABLE 8

Various data
Zoom ratio: 2.037, image height: 21.633

| | Wide angle | Intermediate | Telephoto |
|---|---|---|---|
| Focal length | 71.778 | 100.010 | 146.226 |
| F-number | 4.120 | 4.120 | 4.120 |
| Half angle of view | 16.052 | 11.265 | 7.662 |
| Total lens length | 160.000 | 181.642 | 193.644 |
| Back focus | 34.416 | 34.416 | 34.416 |
| d5 | 4.477 | 26.116 | 38.094 |
| d8 | 2.000 | 4.884 | 10.004 |
| d15 | 10.004 | 7.121 | 2.000 |

TABLE 9

Zoom lens group data

| Group | First surface | Focal length | Lens configuration length | Lens moving distance |
|---|---|---|---|---|
| 1 | 1 | 144.478 | 18.632 | 33.617 |
| 2 | 6 | 150.719 | 6.133 | 0.000 |
| 3 | 9 | −20.731 | 13.856 | −8.004 |
| 4 | 16 | 26.949 | 69.629 | 0.000 |

TABLE 10

Magnification of zoom lens group (from front to rear)

| Group | First Surface | Wide angle | Intermediate | Telephoto |
|---|---|---|---|---|
| 1 | 1 | 0.000 | 0.000 | 0.000 |
| 2 | 6 | 0.533 | 0.577 | 0.605 |
| 3 | 9 | −0.486 | −0.627 | −0.873 |
| 4 | 16 | −1.916 | −1.912 | −1.916 |

Embodiment 3

Figure 13A:
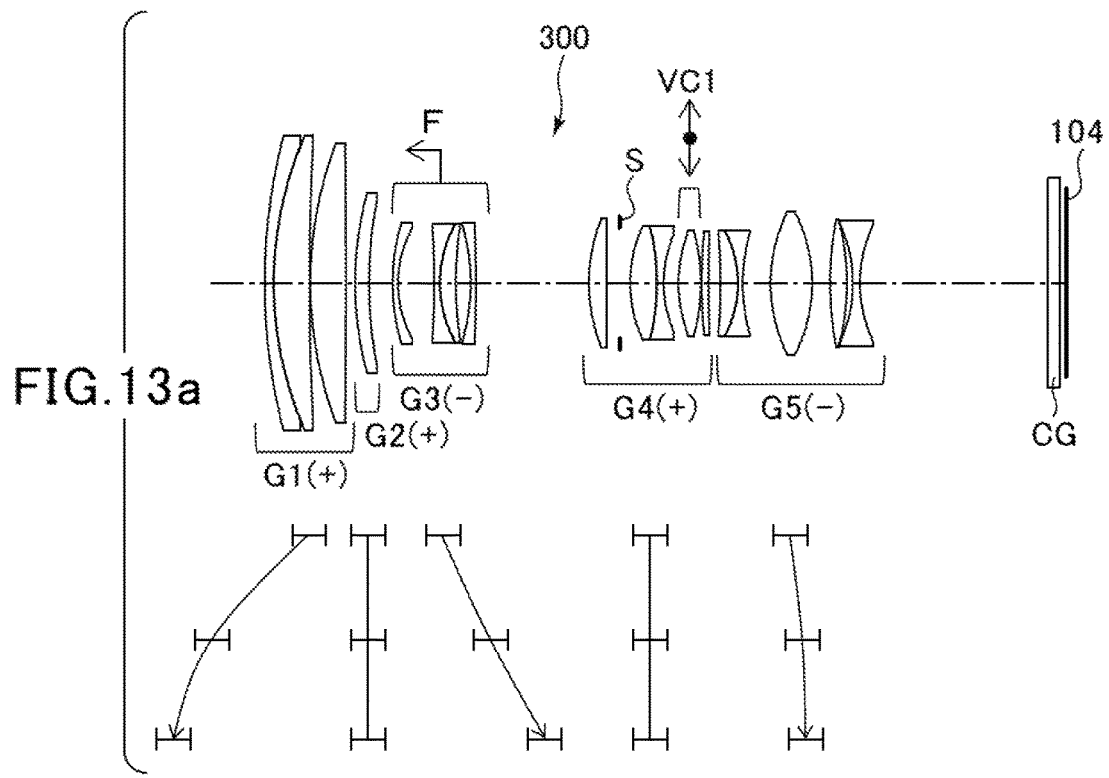
FIG. 13a to 13c are optical cross-sectional views depicting a zoom lens according to Embodiment 3 of the present invention, where
Figure 13B:
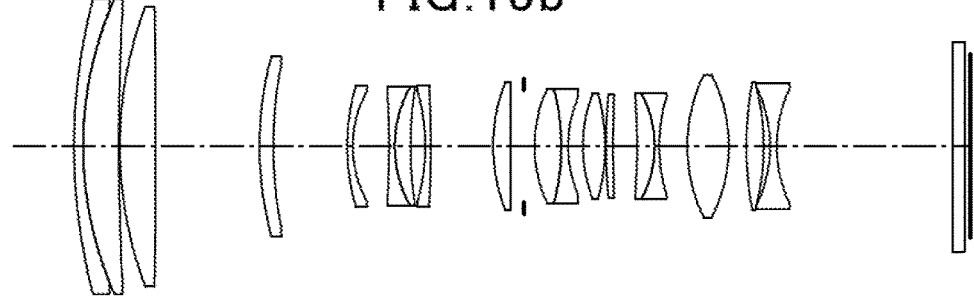
Figure 13C:
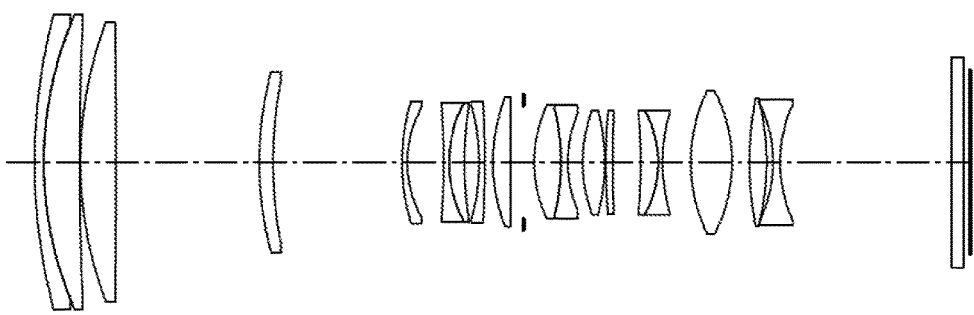
Figure 15:
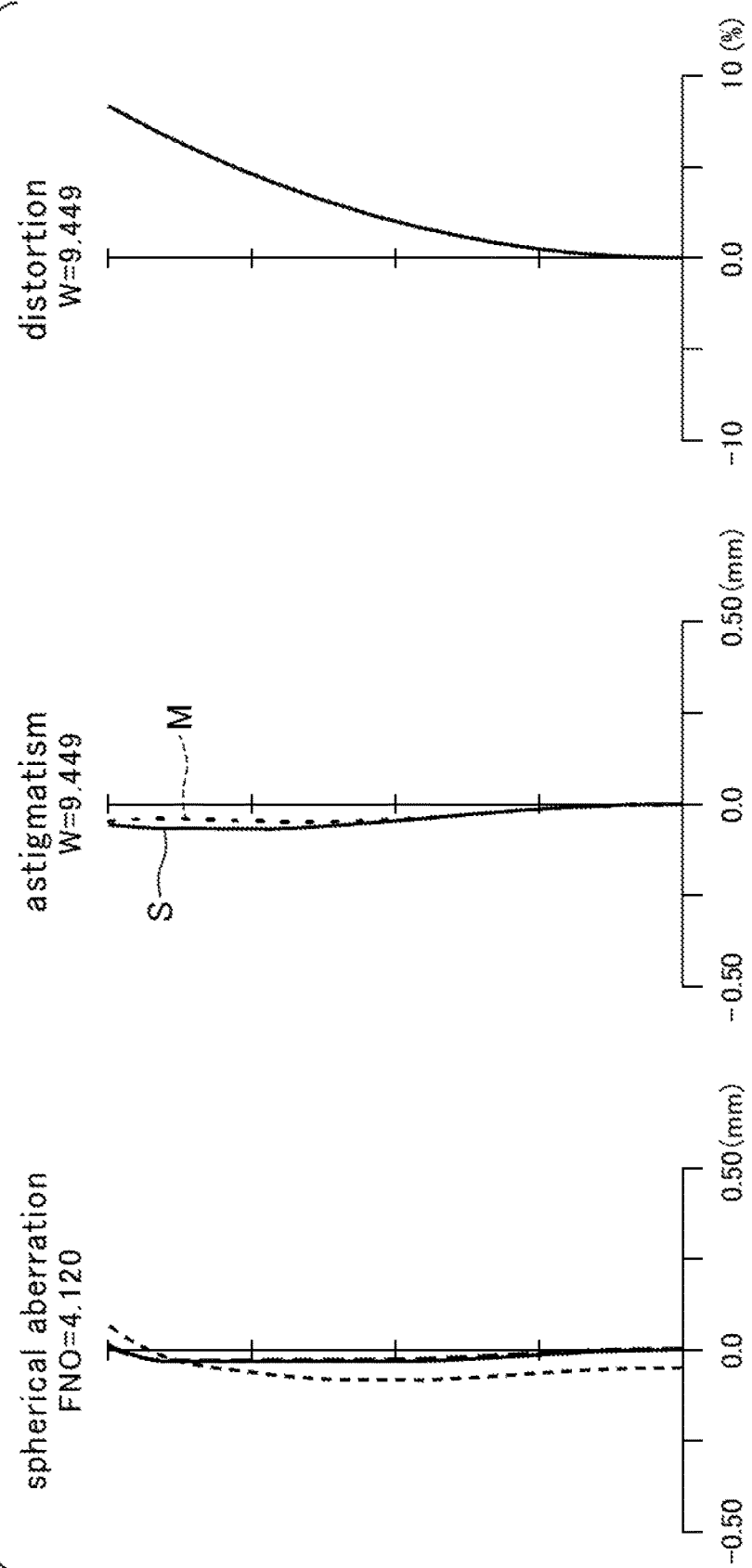
FIG. 15 are graphs showing the longitudinal aberrations of the zoom lens according to Embodiment 3 of the present invention in the intermediate zoom state.
Figure 16:
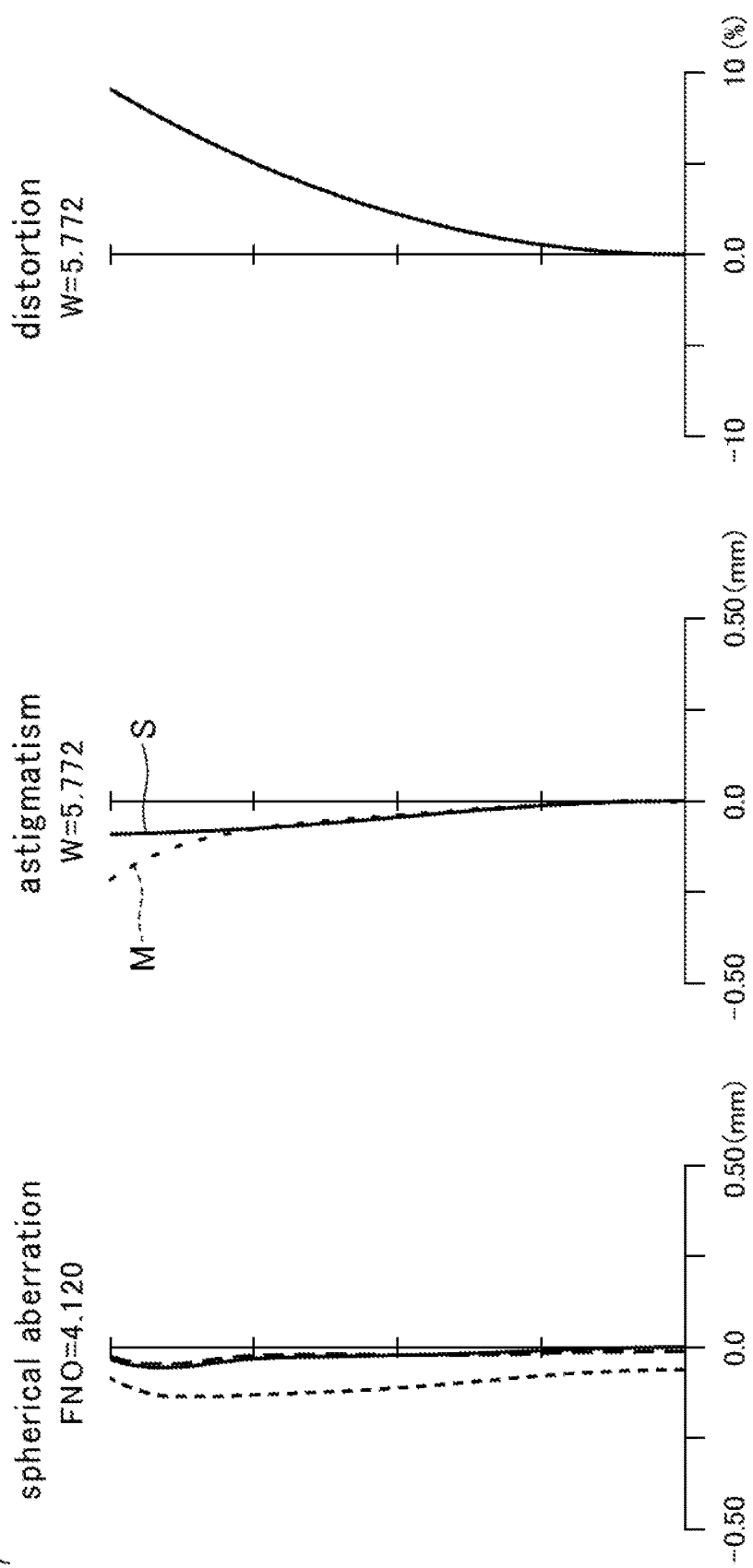
FIG. 16 are graphs showing the longitudinal aberrations of the zoom lens according to Embodiment 3 of the present invention in the telephoto end zoom state.
Figure 17:
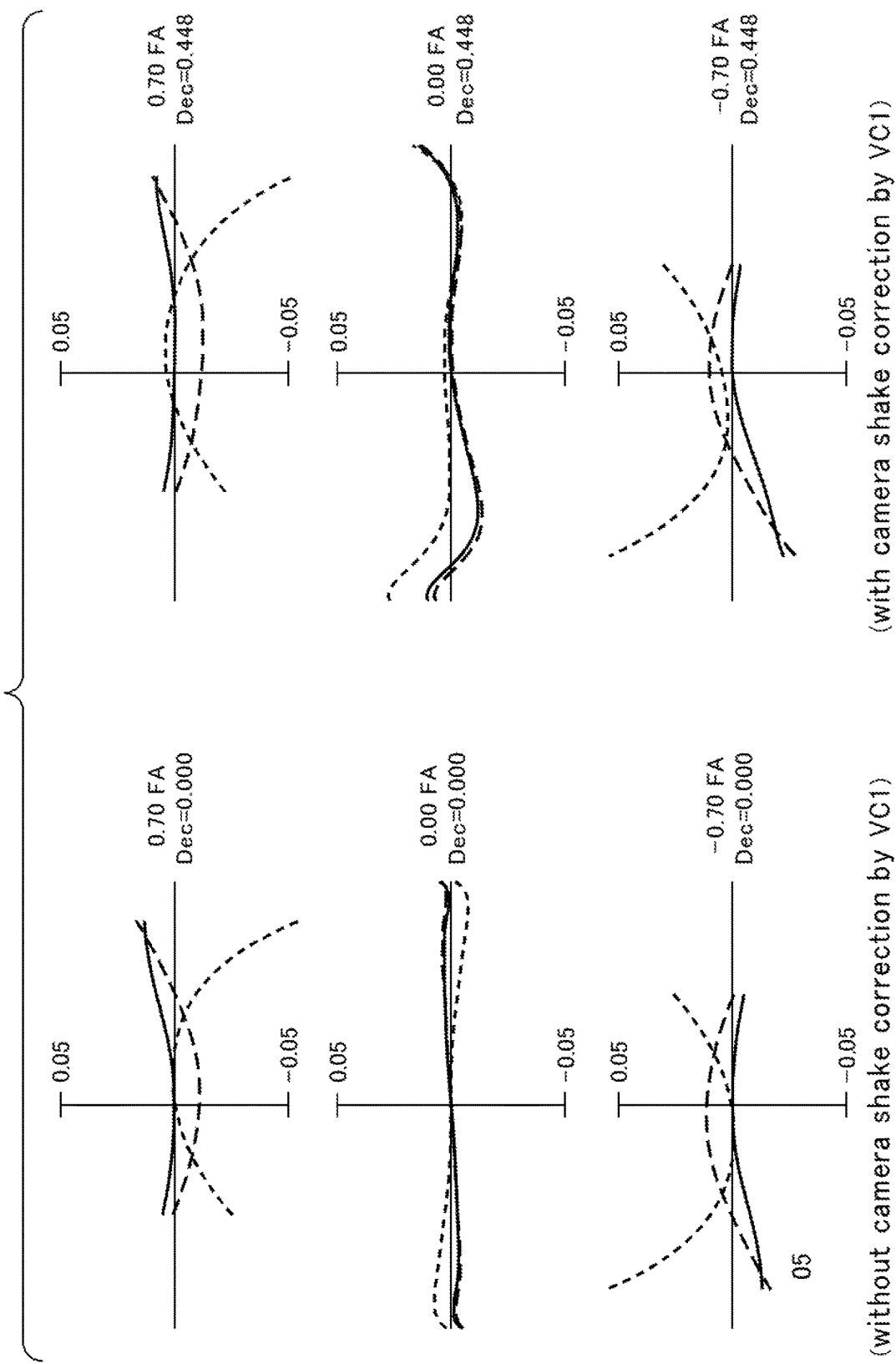
FIG. 17 are graphs showing the lateral aberrations of the zoom lens according to Embodiment 3 of the present invention in the telephoto end zoom state in the case when camera shake correction by the first camera shake correction lens VC1 in the fourth lens group was not performed (left), and in the case when this camera shake correction was performed (right)

A zoom lens according to Embodiment 3 will be described with reference to the drawings. FIG. 13 are diagrams depicting the lens configuration in the wide-angle end zoom state, in the intermediate zoom state, and the telephoto end zoom state respectively, and FIG. 14 to FIG. 16 are graphs showing the longitudinal aberrations in the wide-angle end zoom state, the intermediate zoom state, and the telephoto end zoom state respectively. FIG. 17 are graphs showing the lateral aberrations when camera shake is corrected using the first camera shake correction lens VC1 in the telephoto end zoom state. Table 11 to Table 15 show the numeric data thereof. In this example, the second lens group and the fourth lens group are fixed with respect to the image plane at the time of zooming.

As depicted in FIG. 13, the zoom lens 300 has a first lens group G1, a second lens group G2, a third lens group G3, a fourth lens group G4, and a fifth lens group G5. The third lens group G3 is a focus lens group F. The fourth lens group G4 includes an aperture stop S and the first camera shake correction lens VC1. A light receiving element 104 is disposed at an image forming position and an optical filter CG is disposed in the vicinity of the light receiving element on the object side thereof.

TABLE 11

Surface data

| Surface number | r | d | nd | vd | |
|---|---|---|---|---|---|
| 1 | 125.386 | 2.000 | 1.9537 | 32.32 | |
| 2 | 79.149 | 7.818 | 1.4970 | 81.61 | |
| 3 | 601.791 | 0.200 | | | |
| 4 | 86.028 | 7.780 | 1.4370 | 95.10 | |
| 5 | −2138.421 | d5 | | | |
| 6 | 76.177 | 3.000 | 1.6727 | 32.17 | |
| 7 | 92.988 | d7 | | | |
| 8 | 45.912 | 1.200 | 1.9108 | 35.25 | |
| 9 | 24.718 | 7.954 | | | |
| 10 | −164.311 | 1.200 | 1.4970 | 81.61 | |
| 11 | 26.383 | 3.464 | 1.9212 | 23.96 | |
| 12 | 80.965 | 3.234 | | | |
| 13 | −43.872 | 1.200 | 1.8830 | 40.81 | |
| 14 | −216.986 | d14 | | | |
| 15 | 38.298 | 3.829 | 2.0010 | 29.13 | |
| 16 | −2392.431 | 2.846 | | | |
| 17 | ∞ | 2.309 | | | (Aperture stop) |
| 18 | 28.810 | 5.826 | 1.5928 | 68.62 | |
| 19 | −50.541 | 1.500 | 2.0006 | 25.46 | |
| 20 | 26.515 | 3.289 | | | |
| 21* | 30.151 | 4.824 | 1.4971 | 81.56 | |
| 22* | −42.585 | 0.200 | | | |
| 23 | 109.437 | 1.500 | 1.9229 | 20.88 | |
| 24 | 256.491 | d24 | | | |
| 25 | −125.044 | 3.812 | 1.8467 | 23.78 | |
| 26 | −23.647 | 1.000 | 2.0010 | 29.13 | |
| 27 | 37.585 | 6.121 | | | |
| 28 | 35.133 | 9.058 | 1.6230 | 58.12 | |
| 29 | −33.587 | 3.958 | | | |
| 30 | 74.529 | 3.773 | 1.8467 | 23.78 | |
| 31 | −53.237 | 1.388 | | | |
| 32 | −29.275 | 1.500 | 1.7725 | 49.62 | |
| 33 | 29.381 | d33 | | | |
| 34 | ∞ | 2.500 | 1.5168 | 64.20 | |
| 35 | ∞ | 1.000 | | | |

*indicates aspherical surface

TABLE 12

Aspherical data (aspherical coefficient is 0.00 if not indicated)

| Surface number | k | A4 | A6 | A8 | A10 |
|---|---|---|---|---|---|
| 21 | 0.0000E+00 | −8.9608E−06 | 4.3602E−10 | −1.3596E−10 | 6.2852E−13 |
| 22 | 0.0000E+00 | 4.3555E−06 | −1.2195E−09 | −1.8571E−10 | 8.6257E−13 |

TABLE 13

Various data
Zoom ratio: 2.735, image height: 21.633

| | Wide angle | Intermediate | Telephoto |
|---|---|---|---|
| Focal length | 71.760 | 119.981 | 196.292 |
| F-number | 4.120 | 4.120 | 4.120 |

TABLE 13-continued

Various data
Zoom ratio: 2.735, image height: 21.633

| | Wide angle | Intermediate | Telephoto |
|---|---|---|---|
| Half angle of view | 15.982 | 9.449 | 5.772 |
| Total lens length | 175.000 | 195.876 | 204.449 |
| Back focus | 43.804 | 41.060 | 40.292 |
| d5 | 2.000 | 22.876 | 31.450 |
| d7 | 5.140 | 16.148 | 28.154 |
| d14 | 24.808 | 13.800 | 1.794 |
| d24 | 2.613 | 5.356 | 6.125 |
| d33 | 41.158 | 38.414 | 37.646 |

TABLE 14

Zoom lens group data

| Group | First surface | Focal length | Lens configuration length | Lens moving distance |
|---|---|---|---|---|
| 1 | 1 | 159.934 | 17.797 | 29.450 |
| 2 | 6 | 584.434 | 3.000 | 0.000 |
| 3 | 8 | −29.788 | 18.252 | −23.014 |
| 4 | 15 | 31.009 | 26.124 | 0.000 |
| 5 | 25 | −46.184 | 30.609 | −3.512 |

TABLE 15

Magnification of zoom lens group (from front to rear)

| Group | First surface | Wide angle | Intermediate | Telephoto |
|---|---|---|---|---|
| 1 | 1 | 0.000 | 0.000 | 0.000 |
| 2 | 6 | 0.788 | 0.811 | 0.820 |
| 3 | 8 | −0.412 | −0.621 | −0.984 |
| 4 | 15 | −0.635 | −0.704 | −0.724 |
| 5 | 25 | 2.176 | 2.115 | 2.099 |

Embodiment 4

Figure 20:
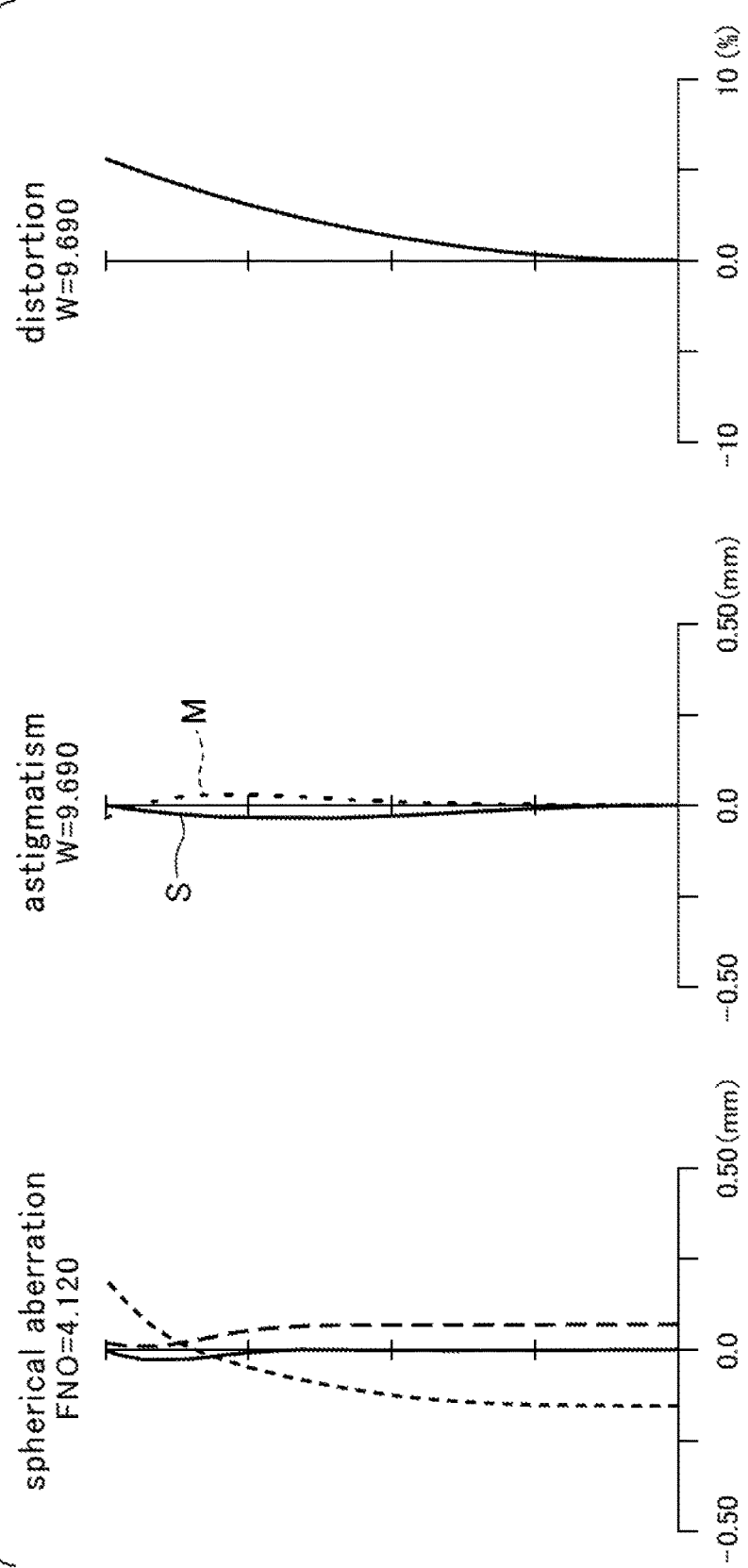
FIG. 20 are graphs showing the longitudinal aberrations of the zoom lens according to Embodiment 4 of the present invention in the intermediate zoom state.
Figure 21:
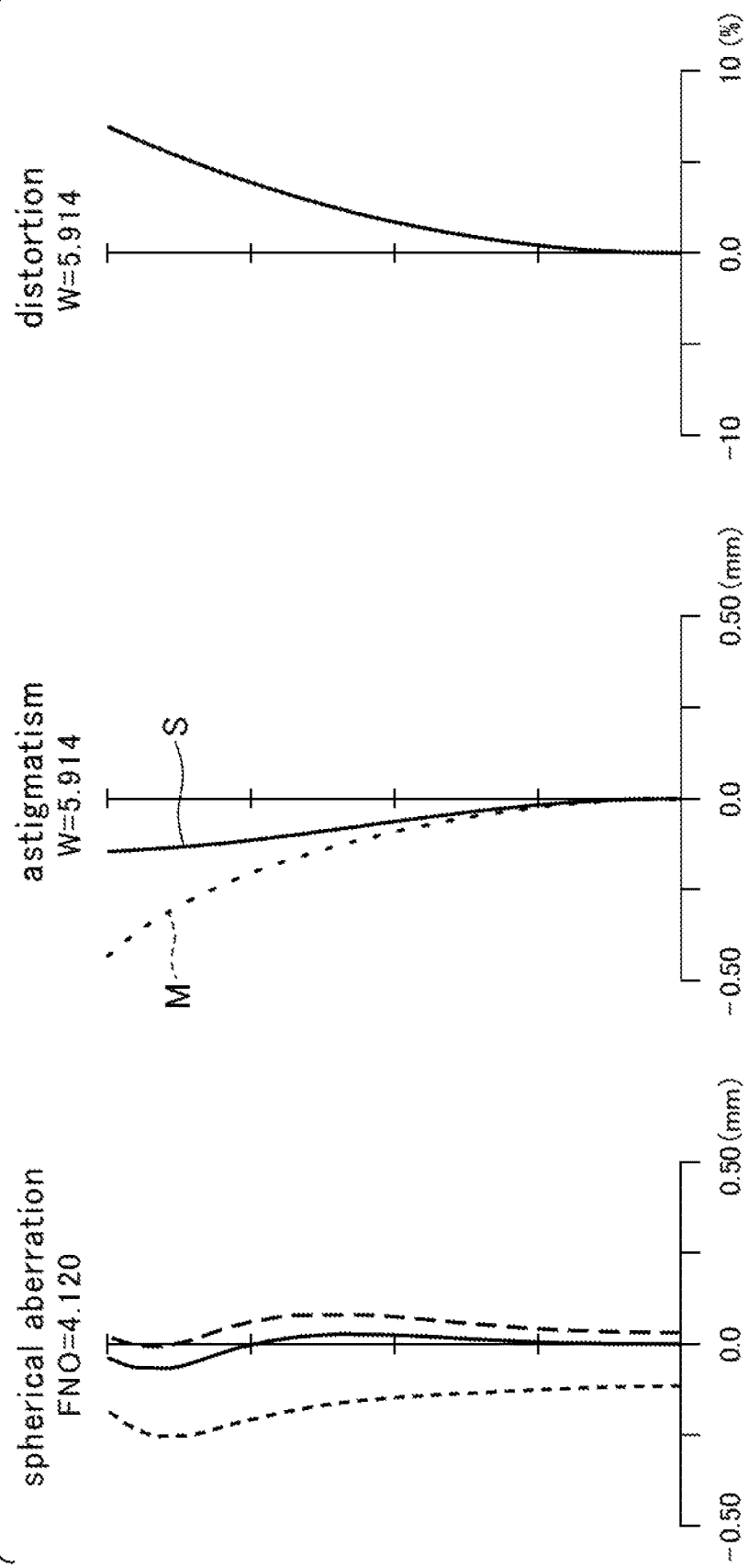
FIG. 21 are graphs showing the longitudinal aberrations of the zoom lens according to Embodiment 4 of the present invention in the telephoto end zoom state.
Figure 22:
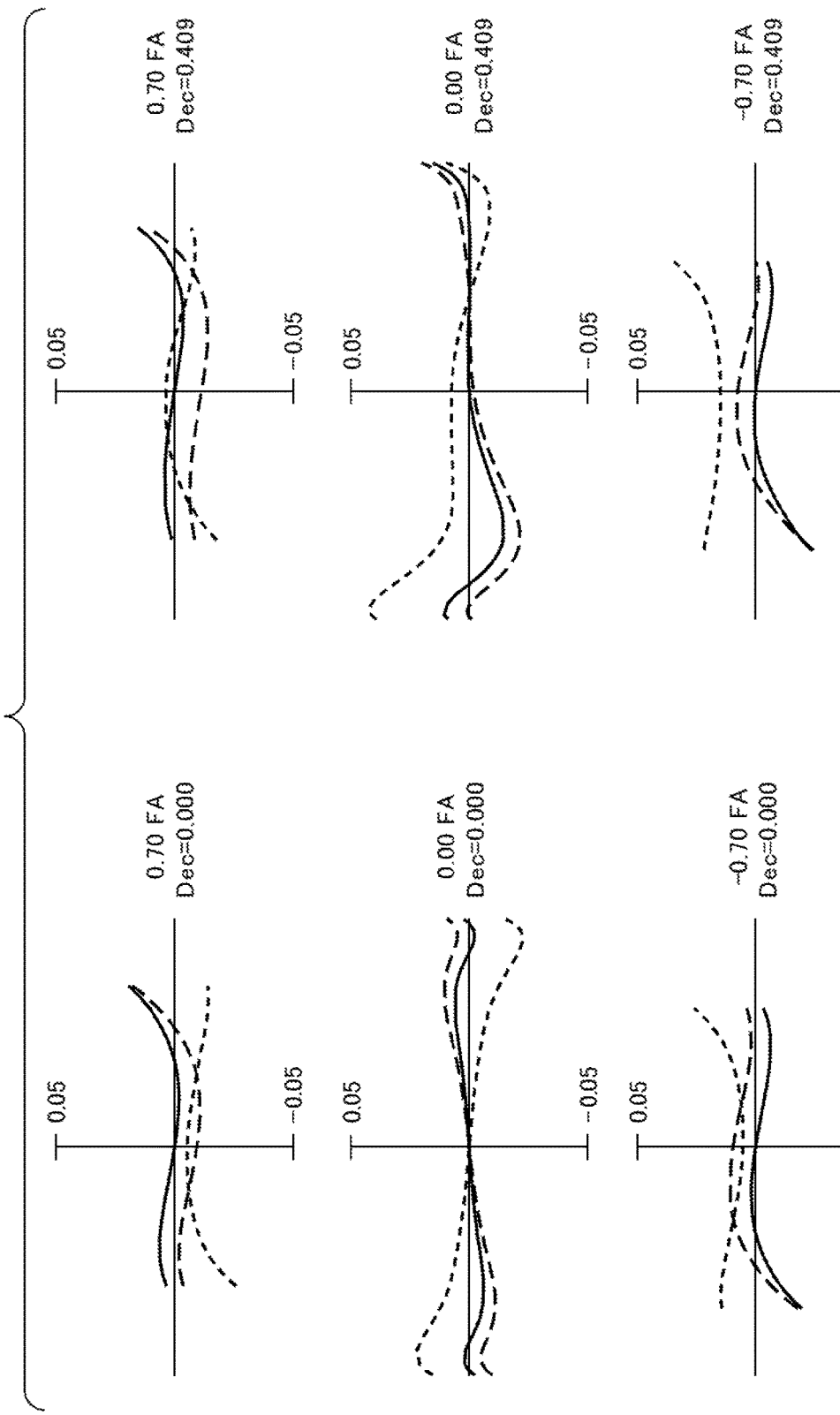
FIG. 22 are graphs showing the lateral aberrations of the zoom lens according to Embodiment 4 of the present invention in the telephoto end zoom state in the case when camera shake correction by the first camera shake correction lens VC1 in the fourth lens group was not performed (left), and in the case when this camera shake correction was performed (right)

A zoom lens according to Embodiment 4 will be described with reference to the drawings. FIG. 18 are diagrams depicting the lens configuration in the wide-angle end zoom state, in the intermediate zoom state, and the telephoto end zoom state respectively, and FIG. 19 to FIG. 21 are graphs showing the longitudinal aberrations in the wide-angle end zoom state, the intermediate zoom state, and the telephoto end zoom state respectively. FIG. 22 are graphs showing the lateral aberrations when camera shake is corrected using the first camera shake correction lens VC1 in the telephoto end zoom state. Table 16 to Table 20 show the numeric data thereof. In this example, the first lens group and the fourth lens group are fixed with respect to the image plane at the time of zooming.

The zoom lens 400 has a first lens group G1, a second lens group G2, a third lens group G3, a fourth lens group G4, a fifth lens group G5, and a sixth lens group G6. The third lens group G3 is a focus lens group F. The fourth lens group G4 includes an aperture stop S and the first camera shake correction lens VC1. A light receiving element 104 is disposed at an image forming position, and an optical filter CG is disposed in the vicinity of the light receiving element on the object side thereof.

TABLE 16

Surface data

| Surface number | r | d | nd | vd | |
|---|---|---|---|---|---|
| 1 | 138.280 | 2.000 | 1.9229 | 20.88 | |
| 2 | 84.483 | 7.265 | 1.4970 | 81.61 | |
| 3 | −318.936 | 0.200 | | | |
| 4 | 79.568 | 4.528 | 1.4370 | 95.10 | |
| 5 | 208.640 | d5 | | | |
| 6 | 191.967 | 3.000 | 1.9229 | 20.88 | |
| 7 | 606.119 | d7 | | | |
| 8 | 2036.537 | 1.200 | 1.8042 | 46.50 | |
| 9 | 40.219 | 2.619 | | | |
| 10 | −115.663 | 1.200 | 1.8810 | 40.14 | |
| 11 | 25.723 | 5.038 | 1.9212 | 23.96 | |
| 12 | −200.398 | 1.523 | | | |
| 13 | −42.347 | 1.200 | 1.8810 | 40.14 | |
| 14 | −151.512 | d14 | | | |
| 15 | 46.916 | 3.821 | 2.0010 | 29.13 | |
| 16 | −762.265 | 3.658 | | | |
| 17 | ∞ | 2.495 | | | (Aperture stop) |
| 18 | 38.658 | 5.601 | 1.5688 | 56.04 | |
| 19 | −46.050 | 1.500 | 1.9212 | 23.96 | |
| 20 | 36.713 | 2.934 | | | |
| 21* | 34.325 | 5.651 | 1.4971 | 81.56 | |
| 22* | −44.217 | 0.200 | | | |
| 23 | 61.603 | 1.635 | 2.0006 | 25.46 | |
| 24 | 126.458 | d24 | | | |
| 25 | −204.037 | 2.564 | 1.9212 | 23.96 | |
| 26 | −27.306 | 1.000 | 2.0010 | 29.13 | |
| 27 | 33.790 | d27 | | | |
| 28 | 84.173 | 7.128 | 1.5688 | 56.04 | |
| 29 | −34.167 | 0.386 | | | |
| 30 | 103.740 | 3.198 | 1.8467 | 23.78 | |
| 31 | −110.128 | 5.662 | | | |
| 32 | −48.081 | 1.500 | 1.8348 | 42.72 | |
| 33 | 55.096 | d33 | | | |
| 34 | ∞ | 2.500 | 1.5168 | 64.20 | |
| 35 | ∞ | 1.000 | | | |

*indicates aspherical surface

TABLE 17

Aspherical data (aspherical coefficient is 0.00 if not indicated)

| Surface number | k | A4 | A6 | A8 | A10 |
|---|---|---|---|---|---|
| 21 | 0.0000E+00 | −6.8057E−06 | −2.8145E−09 | 3.4424E−12 | 1.4222E−14 |
| 22 | 0.0000E+00 | 3.6351E−06 | −4.9846E−09 | −7.9971E−12 | 5.7322E−14 |

TABLE 18

Various data
Zoom ratio: 2.721, image height: 21.633

| | Wide angle | Intermediate | Telephoto |
|---|---|---|---|
| Focal length | 71.806 | 119.996 | 195.372 |
| F-number | 4.120 | 4.120 | 4.120 |
| Half angle of view | 16.401 | 9.690 | 5.914 |
| Total lens length | 200.000 | 200.000 | 200.000 |
| Back focus | 48.495 | 43.945 | 40.572 |
| d5 | 7.218 | 17.697 | 24.184 |
| d7 | 13.623 | 20.629 | 28.383 |
| d14 | 33.673 | 16.188 | 1.947 |
| d24 | 2.579 | 7.812 | 11.844 |
| d27 | 14.852 | 14.169 | 13.510 |
| d33 | 45.849 | 41.299 | 37.926 |

TABLE 19

Zoom lens group data

| Group | First surface | Focal length | Lens configuration length | Lens moving distance |
|---|---|---|---|---|
| 1 | 1 | 151.421 | 13.993 | 0.000 |
| 2 | 6 | 303.377 | 3.000 | −16.966 |
| 3 | 8 | −26.281 | 12.780 | −31.726 |
| 4 | 15 | 30.560 | 27.494 | 0.000 |
| 5 | 25 | −26.761 | 3.564 | −9.266 |
| 6 | 28 | 64.638 | 17.874 | −7.923 |

TABLE 20

Magnification of zoom lens group (from front to rear)

| Group | First surface | Wide-angle | Intermediate | Telephoto end |
|---|---|---|---|---|
| 1 | 1 | 0.000 | 0.000 | 0.000 |
| 2 | 6 | 0.687 | 0.703 | 0.714 |
| 3 | 8 | −0.529 | −0.698 | −0.987 |
| 4 | 15 | −0.518 | −0.665 | −0.778 |
| 5 | 25 | −32.583 | −323.581 | 53.437 |
| 6 | 28 | −0.077 | −0.007 | 0.044 |

Embodiment 5

Figure 23A:
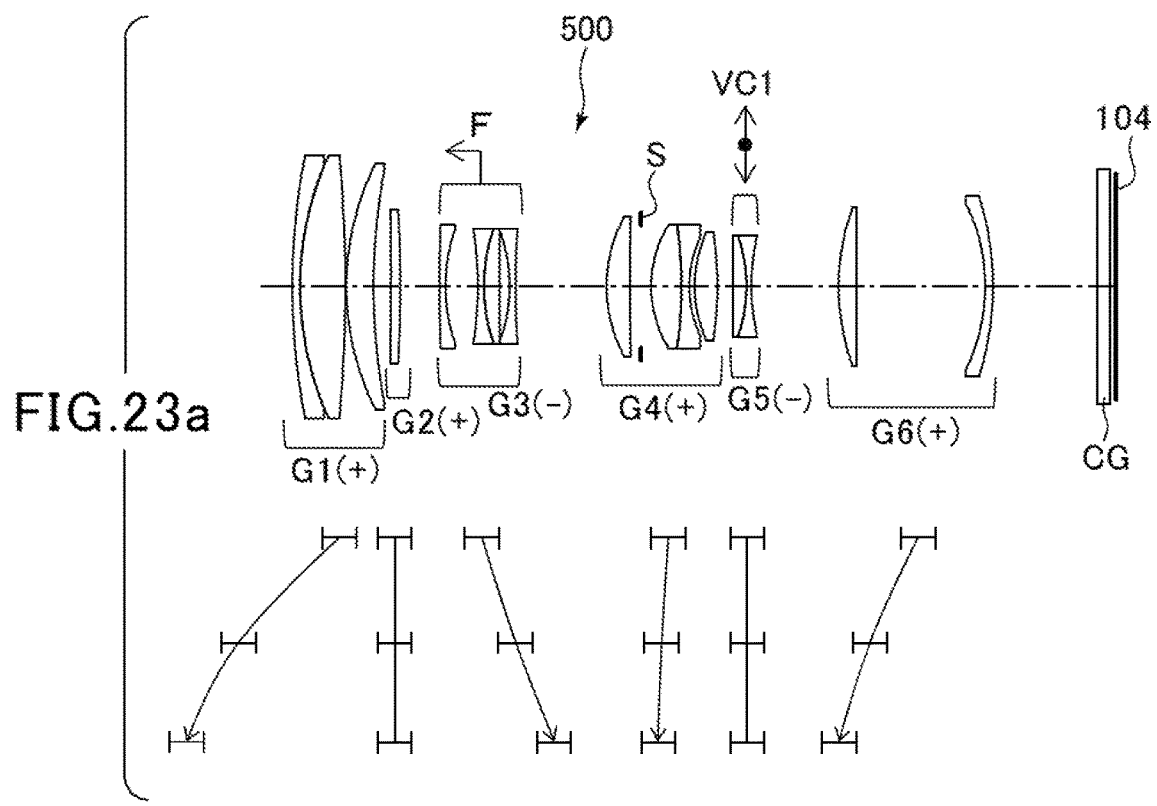
FIG. 23a to 23c are optical cross-sectional views depicting a zoom lens according to Embodiment 5 of the present invention, where
Figure 23B:
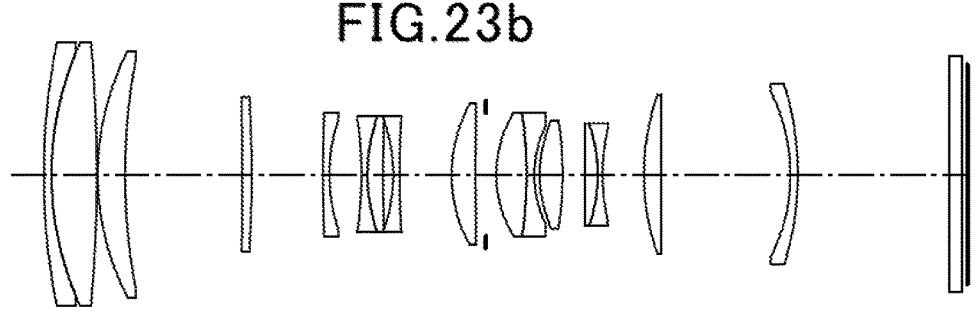
Figure 23C:
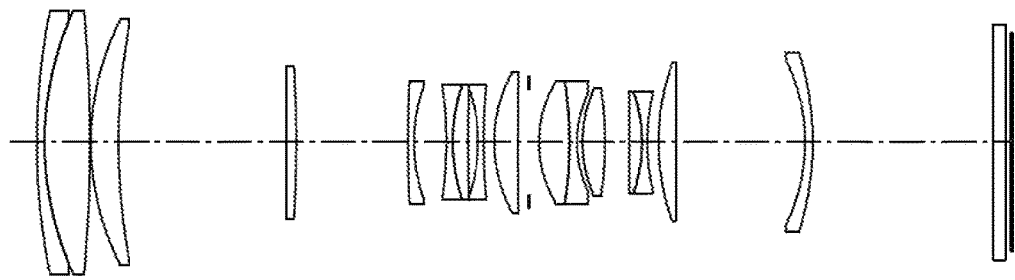
Figure 27:
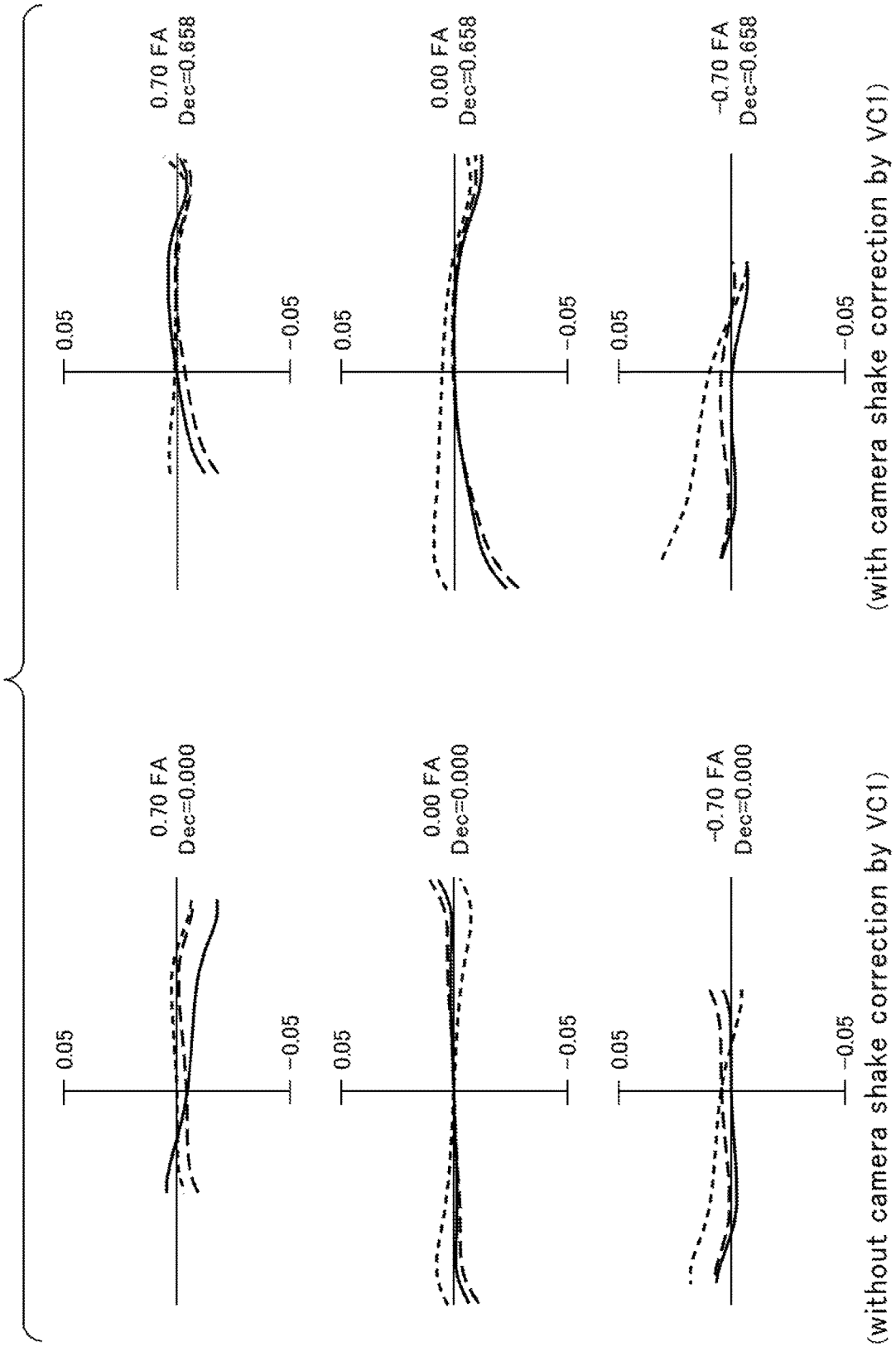
FIG. 27 are graphs showing the lateral aberrations of the zoom lens according to Embodiment 5 of the present invention in the telephoto end zoom state in the case when camera shake correction by the first camera shake correction lens VC1 in the fourth lens group was not performed (left), and in the case when this camera shake correction was performed (right)

A zoom lens according to Embodiment 5 will be described with reference to the drawings. FIG. 23 are diagrams depicting the lens configuration in the wide-angle end zoom state, in the intermediate zoom state, and the telephoto end zoom state respectively, and FIG. 24 to FIG. 28 are graphs showing the longitudinal aberrations in the wide-angle end zoom state, the intermediate zoom state, and the telephoto end zoom state respectively. FIG. 29 are graphs showing the lateral aberrations when camera shake is corrected using the first camera shake correction lens VC1 in the telephoto end zoom state. Table 21 to Table 25 show the numeric data thereof. In this example, the first lens group and the fourth lens group are fixed with respect to the image plane at the time of zooming.

The zoom lens 500 has a first lens group G1, a second lens group G2, a third lens group G3, a fourth lens group G4, a fifth lens group G5, and a sixth lens group G6. The third lens group G3 is a focus lens group F. The fourth lens group G4 includes an aperture stop S. The fifth lens group G5 is the first camera shake correction lens VC1. A light receiving element 104 is disposed at an image forming position, and an optical filter CG is disposed in the vicinity of the light receiving element on the object side thereof.

TABLE 21

Surface data

| Surface number | r | d | nd | vd | |
|---|---|---|---|---|---|
| 1 | 130.424 | 1.500 | 1.9537 | 32.32 | |
| 2 | 60.949 | 8.822 | 1.4970 | 81.61 | |
| 3 | −279.102 | 0.200 | | | |
| 4 | 52.559 | 5.308 | 1.4370 | 95.10 | |
| 5 | 122.198 | d5 | | | |
| 6 | −2137.781 | 1.853 | 2.1041 | 17.02 | |
| 7 | −247.560 | d7 | | | |
| 8 | 286.615 | 1.200 | 1.9037 | 31.31 | |
| 9 | 33.131 | 6.265 | | | |
| 10 | −73.402 | 1.200 | 1.4970 | 81.61 | |
| 11 | 33.970 | 3.027 | 2.0006 | 25.46 | |
| 12 | 444.106 | 1.963 | | | |
| 13 | −31.331 | 1.200 | 1.4970 | 81.61 | |
| 14 | 148.768 | d14 | | | |
| 15 | 28.377 | 4.620 | 1.8348 | 42.72 | |
| 16 | 876.956 | 2.087 | | | |
| 17 | ∞ | 2.000 | | | (Aperture stop) |
| 18 | 23.078 | 5.924 | 1.4970 | 81.61 | |
| 19 | −76.430 | 1.500 | 2.0006 | 25.46 | |
| 20 | 21.954 | 1.000 | | | |
| 21* | 23.017 | 4.478 | 1.5831 | 59.46 | |
| 22* | −58.792 | d22 | | | |
| 23 | ∞ | 2.563 | 1.9229 | 20.88 | |
| 24 | −29.313 | 1.000 | 1.9108 | 35.25 | |
| 25 | 43.604 | d25 | | | |
| 26 | 45.753 | 3.430 | 1.6200 | 36.30 | |
| 27 | 4481.565 | 25.186 | | | |
| 28 | −36.067 | 1.500 | 1.8810 | 40.14 | |
| 29 | −57.955 | d29 | | | |
| 30 | ∞ | 2.500 | 1.5168 | 64.20 | |
| 31 | ∞ | 1.000 | | | |

*indicates aspherical surface

TABLE 22

Aspherical data (aspherical coefficient is 0.00 if not indicated)

| Surface number | k | A4 | A6 | A8 | A10 |
|---|---|---|---|---|---|
| 21 | 0.0000E+00 | −1.5413E−05 | −3.4557E−08 | 3.6316E−10 | −4.1222E−12 |
| 22 | 0.0000E+00 | 1.2322E−05 | −3.1817E−08 | 4.4017E−10 | −4.1424E−12 |

TABLE 23

Various data
Zoom ratio: 2.713, image height: 21.633

| | Wide angle | Intermediate | Telephoto |
|---|---|---|---|
| Focal length | 71.791 | 119.933 | 194.787 |
| F-number | 4.120 | 4.548 | 5.417 |
| Half angle of view | 16.978 | 10.055 | 6.152 |
| Total lens length | 160.461 | 179.986 | 190.000 |
| Back focus | 23.028 | 32.013 | 37.812 |
| d5 | 3.343 | 22.868 | 32.882 |
| d7 | 7.591 | 13.916 | 21.771 |
| d14 | 17.783 | 10.268 | 2.021 |
| d22 | 3.056 | 4.246 | 4.638 |
| d25 | 16.981 | 7.997 | 2.198 |
| d29 | 20.382 | 29.367 | 35.165 |

TABLE 24

Zoom lens group data

| Group | First surface | Focal length | Lens configuration length | Lens moving distance |
|---|---|---|---|---|
| 1 | 1 | 154.375 | 15.830 | 29.539 |
| 2 | 6 | 253.431 | 1.853 | 0.000 |
| 3 | 8 | −24.484 | 14.855 | −14.180 |
| 4 | 15 | 29.127 | 21.609 | 1.582 |
| 5 | 23 | −49.036 | 3.563 | 0.000 |
| 6 | 26 | 131.592 | 30.115 | 14.783 |

TABLE 25

Magnification of zoom lens group (from front to rear)

| Group | First surface | Wide angle | Intermediate | Telephoto |
|---|---|---|---|---|
| 1 | 1 | 0.000 | 0.000 | 0.000 |
| 2 | 6 | 0.638 | 0.671 | 0.660 |
| 3 | 8 | −0.444 | −0.606 | −0.876 |
| 4 | 15 | −0.920 | −1.037 | −1.100 |
| 5 | 23 | 3.877 | 4.698 | 5.458 |
| 6 | 26 | 0.460 | 0.392 | 0.348 |

[Conditional Formula Correspondence Values]

Table 26 shows the conditional expression correspondence values of respective embodiments which correspond to the conditional formulae disclosed in the Claims.

TABLE 26

Conditional formula correspondence values

|  | Embodiment 1 | Embodiment 2 | Embodiment 3 | Embodiment 4 | Embodiment 5 |
|---|---|---|---|---|---|
| Conditional formula (1) | −2.711 | −4.200 | −1.280 | 0.000 | −2.083 |
| Conditional formula (2) | 1.998 | 1.075 | 1.756 | 1.448 | 1.373 |
| Conditional formula (3) | 1.517 | 1.410 | 1.348 | 1.278 | 1.305 |
| Conditional formula (4) | 0.989 | 1.134 | 1.145 | 1.458 | 1.375 |
| Conditional formula (5) | −0.272 | −0.315 | −0.251 | −0.222 | −0.207 |
| Conditional formula (6) | 0.234 | 0.260 | 0.185 | 0.204 | 0.252 |
| m1 | 47.221 | 33.617 | 29.450 | 0.000 | 29.539 |
| m3 | −17.417 | −8.004 | −23.014 | −31.726 | −14.180 |
| f12w | 93.281 | 77.184 | 125.996 | 103.974 | 98.540 |
| fw | 71.847 | 71.778 | 71.760 | 71.806 | 71.791 |
| f1 | 179.508 | 144.478 | 159.934 | 151.421 | 154.375 |
| ft | 194.907 | 146.226 | 196.292 | 195.372 | 194.787 |
| b3t | −1.643 | −0.873 | −0.984 | −0.987 | −0.876 |
| b3w | −0.599 | −0.486 | −0.412 | −0.529 | −0.444 |
| ff | −32.155 | −32.297 | −29.788 | −26.281 | −24.484 |
| fv | 45.704 | 37.998 | 36.310 | 39.825 | −49.036 |

Figure 28:
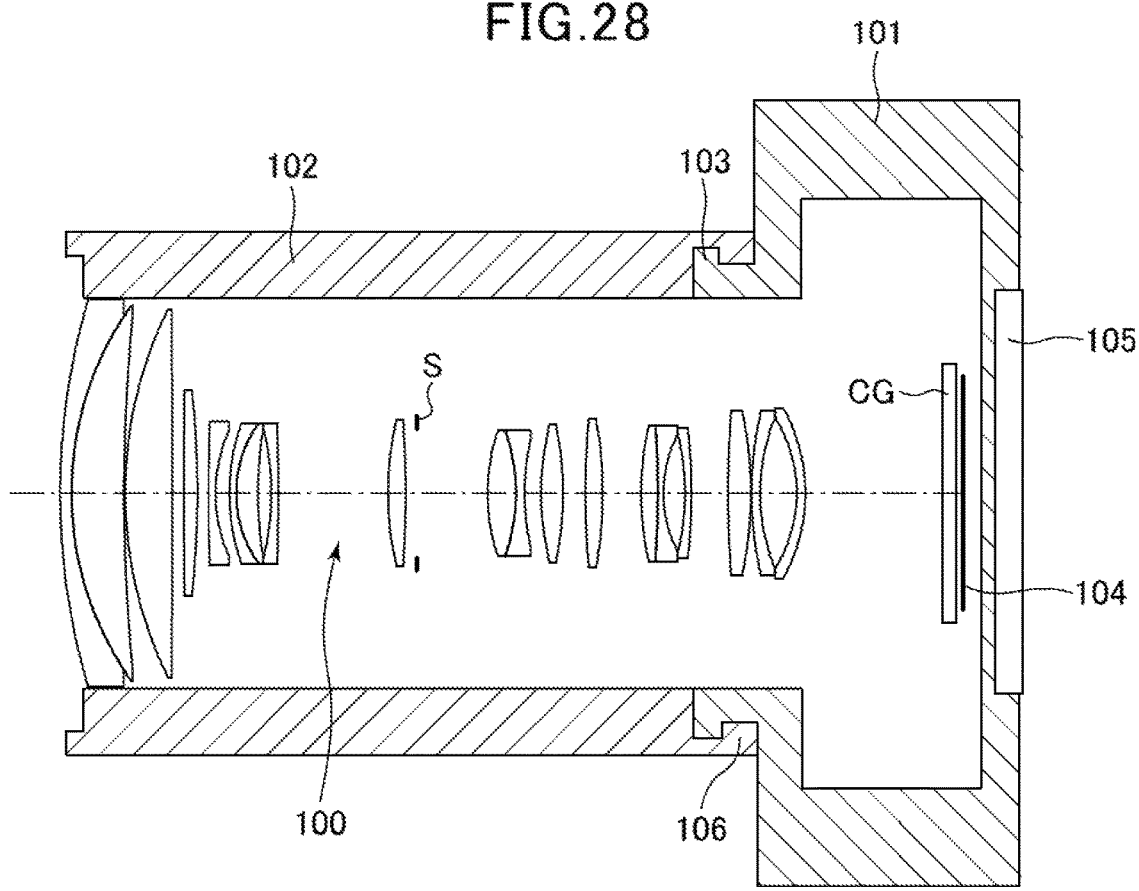
FIG. 28 is a diagram depicting a configuration of an imaging apparatus according to the present invention.

As depicted in FIG. 28, in the imaging apparatus of embodiment of the present invention, the zoom lens 100 of the present invention is held by a lens barrel 102. The lens barrel 102 has a lens mount 106 for attaching the zoom lens 100 to a camera body 101. The camera body 101 has a body mount 103 on the front surface thereof, and a liquid crystal monitor 105 on the rear surface thereof, and includes a light receiving element 104 inside. The zoom lens 100 can be attached to the camera body 101 by combining the lens mount 106 with the body mount 103.

What is claimed is:

1. A zoom lens comprising, in order from an object side: a first lens group having positive refractive power; a second lens group having positive refractive power; a third lens group having negative refractive power; and a fourth lens group having positive refractive power, wherein
at a time of zooming from a wide-angle end state to a telephoto end state, the third lens group moves so that a distance between the second lens group and the third lens group increases and a distance between the third lens group and the fourth lens group decreases, and
a moving distance of each of the lens groups based on an image plane from the wide-angle end state to the telephoto end state satisfies a following conditional formula (1) when movement to the object side is positive and an image side is negative:

$$-4.500 \leq m1/m3 \leq 0.000 \tag{1}$$

where
m1: the moving distance of the first lens group,
m3: the moving distance of the third lens group,
and wherein the zoom lens also includes a focus lens group that performs focusing and a following conditional formula (5) is satisfied:

$$-0.500 \leq ff/\sqrt{(fw \times ft)} \leq -0.100 \tag{5}$$

where
ff: focal length of the focus lens group,
fw: focal length of the zoom lens in the wide-angle end state,
ft: focal length of the zoom lens in the telephoto end state.

2. The zoom lens according to claim 1, wherein a following conditional formula (2) is satisfied:

$$0.700 \leq f12w/fw \leq 2.300 \tag{2}$$

where
f12w: composite focal length of the first lens group and the second lens group in the wide-angle end state,
fw: focal length of the zoom lens in the wide-angle end state.

3. The zoom lens according to claim 1, wherein a following conditional formula (3) is satisfied:

$$0.800 \leq f1/\sqrt{(fw \times ft)} \leq 2.000 \tag{3}$$

where
f1: focal length of the first lens group,
fw: focal length of the zoom lens in the wide-angle end state,
ft: focal length of the zoom lens in the telephoto end state.

4. The zoom lens according to claim 1, wherein a following conditional formula (4) is satisfied:

$$0.500 \leq |(ft/fw)/(b3t/b3w)| \leq 2.000 \tag{4}$$

where
ft: focal length of the zoom lens in the telephoto end state,
fw: focal length of the zoom lens in the wide-angle end state,
b3t: lateral magnification of the third lens group in the telephoto end state,
b3w: lateral magnification of the third lens group in the wide-angle end state.

5. The zoom lens according to claim 1, wherein a camera shake correction lens group which corrects camera shake by moving vertically to an optical axis is included, and a following conditional formula (6) is satisfied:

$$0.100 \leq |fv|/ft \leq 0.500 \tag{6}$$

where
fv: focal length of the camera shake correction lens group,
ft: focal length of the zoom lens in the telephoto end state.

6. The zoom lens according to claim 5, wherein
at a time of zooming, the camera shake correction lens group is fixed in an optical axis direction with respect to the image plane.

7. An imaging apparatus comprising:
a zoom lens; and
an image pickup element configured to convert a formed optical image into an electric signal, wherein
the zoom lens comprises, in order from an object side, a first lens group having positive refractive power, a second lens group having positive refractive power, a third lens group having negative refractive power, and a fourth lens group having positive refractive power, and in the zoom lens,
at a time of zooming from a wide-angle end state to a telephoto end state, the third lens group moves so that a distance between the second lens group and the third lens group increases, and a distance between the third lens group and the fourth lens group decreases, and
a moving distance of each of the lens groups based on an image plane from the wide-angle end state to the telephoto end state satisfies a following conditional formula (1) when movement to the object side is positive and an image side is negative:

$$-4.500 \leq m1/m3 \leq 0.000 \tag{1}$$

where
m1: the moving distance of the first lens group,
m3: the moving distance of the third lens group,
and wherein the zoom lens also includes a focus lens group that performs focusing and a following conditional formula (5) is satisfied:

$$-0.500 \leq ff/\sqrt{(fw \times ft)} \leq -0.100 \tag{5}$$

where
ff: focal length of the focus lens group,
fw: focal length of the zoom lens in the wide-angle end state,
ft: focal length of the zoom lens in the telephoto end state.

* * * * *